(12) United States Patent
Peris et al.

(10) Patent No.: US 11,216,850 B2
(45) Date of Patent: Jan. 4, 2022

(54) PREDICTIVE PLATFORM FOR DETERMINING INCREMENTAL LIFT

(71) Applicant: Roku DX Holdings, Inc., Los Gatos, CA (US)

(72) Inventors: Charith Srian Peris, Cambridge, MA (US); Saket Subhash Mengle, Mansfield, MA (US); Beth Teresa Logan, Cambridge, MA (US); Willard Lennox Simmons, Boston, MA (US)

(73) Assignee: ROKU DX HOLDINGS, INC., Los Gatos, CA (US)

( * ) Notice: Subject to any disclaimer, the term of this patent is extended or adjusted under 35 U.S.C. 154(b) by 0 days.

(21) Appl. No.: 16/792,013

(22) Filed: Feb. 14, 2020

(65) Prior Publication Data

US 2021/0035163 A1 Feb. 4, 2021

Related U.S. Application Data

(60) Provisional application No. 62/882,382, filed on Aug. 2, 2019.

(51) Int. Cl.
| | |
|---|---|
| *G06Q 30/02* | (2012.01) |
| *G06N 5/04* | (2006.01) |
| *G06N 20/00* | (2019.01) |
| *G06N 3/02* | (2006.01) |

(52) U.S. Cl.
CPC .......... *G06Q 30/0275* (2013.01); *G06N 5/04* (2013.01); *G06N 20/00* (2019.01); *G06Q 30/0243* (2013.01); *G06Q 30/0244* (2013.01); *G06Q 30/0246* (2013.01); *G06Q 30/0277* (2013.01); *G06N 3/02* (2013.01)

(58) Field of Classification Search
CPC ................................. G06Q 30/0207–30/0277
USPC ....................................... 705/14, 319, 14.45
See application file for complete search history.

(56) References Cited

U.S. PATENT DOCUMENTS

| | | | | |
|---|---|---|---|---|
| 2009/0138342 A1* | 5/2009 | Otto | ....................... | G06N 5/025 706/45 |
| 2011/0153501 A1* | 6/2011 | Agarwal | .............. | G06Q 50/184 705/51 |
| 2014/0095324 A1* | 4/2014 | Cabral | ............... | G06Q 30/0243 705/14.71 |

(Continued)

OTHER PUBLICATIONS

Counterfactual-based Incrementality Measurement in a Digital Ad-Buying Platform (Year: 2017).*

(Continued)

*Primary Examiner* — Gautam Ubale
(74) *Attorney, Agent, or Firm* — Sterne, Kessler, Goldstein & Fox P.L.L.C.

(57) ABSTRACT

The presented technology is directed to devices, systems, and their methods of use for evaluating and optimizing the effectiveness of digital advertisements to increase sales such as in a digital ad-buying platform. In particular, the presented platform is configured for determining incremental lift of a product due to an advertisement and/or a promotion that is distributed online. Presented herein, therefore, are devices, systems, and methods of monitoring, measuring, and/or optimizing lift of an advertising campaign, such as a real-time, digital ad buying campaign implemented by a suitably configured advertising platform.

22 Claims, 6 Drawing Sheets

(56) References Cited

U.S. PATENT DOCUMENTS

| | | | | |
|---|---|---|---|---|
| 2015/0213479 A1* | 7/2015 | Musumeci | ....... | H04N 21/25891 |
| | | | | 705/14.41 |
| 2016/0283974 A1* | 9/2016 | Sodomka | ........... | G06Q 30/0275 |
| 2017/0372352 A1* | 12/2017 | Riordan | ............. | G06Q 30/0246 |
| 2019/0043092 A1* | 2/2019 | Zacharski | ........... | G06Q 30/0275 |
| 2019/0087868 A1* | 3/2019 | Setty | ................... | G10L 15/1815 |
| 2019/0130436 A1* | 5/2019 | Ma | ..................... | G06Q 30/0244 |
| 2019/0164082 A1* | 5/2019 | Wu | ........................ | G06Q 50/01 |
| 2019/0287138 A1* | 9/2019 | Buchalter | .......... | G06Q 30/0277 |
| 2020/0349608 A1* | 11/2020 | Liang | .................. | G06F 16/9538 |
| 2020/0380555 A1* | 12/2020 | Fan | ........................ | G06N 20/00 |

OTHER PUBLICATIONS

How effective is targeted advertising? (Year: 2013).*
An Enhanced Ad Event-Prediction Method Based on Feature Engineering (Year: 2019).*
Development_of_Autonomous_Intelligent_System_for_Google_Ads (Year: 2018).*
Multimodal_Content_Analysis_for_Effective_Advertisements_on_YouTube (Year: 2017).*
Online_Model_Evaluation_in_a_Large-Scale_Computational_Advertising_Platform (Year: 2015).*

* cited by examiner

PREDICTIVE PLATFORM FOR DETERMINING INCREMENTAL LIFT

CROSS-REFERENCE TO RELATED APPLICATIONS

The present application claims priority from U.S. Provisional Patent Application No. 62/882,382, filed Aug. 2, 2019, entitled "PREDICTIVE PLATFORM FOR DETERMINING INCREMENTAL LIFT", the disclosure of which is incorporated herein by reference in its entirety.

FIELD OF INVENTION

The presented technology is directed to devices, systems, and their methods of use for evaluating and optimizing the effectiveness of digital advertisements to increase sales such as in a digital ad-buying platform. In particular, the presented platform is configured for determining incremental lift of a product due to an advertisement and/or a promotion that is distributed online. Presented herein, therefore, are devices, systems, and methods of monitoring, measuring, and/or optimizing lift of an advertising campaign, such as a real-time, digital ad buying campaign implemented by a suitably configured advertising platform.

BACKGROUND

The following description of the background of the disclosure is provided simply as an aid in understanding the various disclosed embodiments and is not admitted to describe or constitute prior art to the disclosure.

Lift is an increase in sales that is in response to an advertisement or other promotion. Basically, lift is a measure of increased (or decreased) performance of a targeted marketing campaign, which is measured by one or more determined metrics. Particularly, there exist several models that use lift as a variable in classifying and/or predicting the effectiveness of an advertisement, such as based on a consumer response level. Typical models measure the response of a selected population against a random population viewing a particular advertisement, where positive lift is present in the condition where those viewing the advertisement have an increased response rate over those in the general population as a whole.

One particular model for measuring such lift is a random choice targeting model. A targeting model performs well if a response is within the target population is better than the average for the population as a whole. Accordingly, in its most basic form, lift is simply the ratio of a value representing a response metric of a target population divided by an average response metric for a general population as a whole. As applied in accordance with this methodology, performance of a lift model involves dividing a targeted population into panels, such as halves or even quantiles, and then ranking the halves or quantiles by a determined lift quantity, whereby each half or quantile can be measured against each other and/or a standard by weighing the predicted response rate and its associated benefits, e.g., financial benefits, versus the cost, and then comparing the outcomes for each quantile one against the other.

Lift, measured in this manner, however, has several disadvantages. For instance, it is labor intensive, as the study has to be designed, quantiles have to be recruited, test have to be conducted, and advertisements have to be transmitted to each quantile have to be paid for, all at a high expense to the advertiser seeking to test its advertisement campaign in this manner. Further, this expense rises rapidly when there are multiple versions of an advertisement that need be tested. Furthermore, there are a variety of biases that can be introduced into such analyses, such as inherent to the ranking methodology, the manner by which advertisements are presented to each quantile, the way suitable controls are determined, and observer bias, just to name a few.

A measurement related to lift is incrementality. Generally, incrementality is a measurement for the amount of change that is caused by a small increment of input, such as where the input is an advertisement or other promotion under evaluation. Particularly, with respect to online advertising, incrementality can be determined, at least in part, based on one or more forms of impression and/or conversion. For example, one of the most pertinent questions to be resolved for an organization and/or advertiser engaging in online advertising is determining the success of the online advertising campaigns they run. Typically, this success is measured by conversion rates, which conversion rates may be determined by a number of different defined characteristics, such as by a number of impresses, clicking on a banner ad (clicks), visits at an advertisement page (site visits), length of stay on the advertisement page, bounce rate, number of pages visited per session, actual purchases made, etc. However, a question remains as to which, if any, of these instances is caused, or in some manner positively influenced by the nature of one or more advertisements in an advertisement campaign being run. Incrementality attempts to measure the effectiveness of such advertisements.

There have been several methods for determining incrementality, which may range from a simple comparison, such as measuring impressions and/or conversion rates pre and post advertising campaign to more complex mathematical modeling. In various instances, lift due to a marketing campaign can be determined by performing incrementality testing. Essentially, incremental lift is typically used to determine the effectiveness achieved by an advertisers' brand ad as measured against an unbiased control group. Specifically, one incremental testing regime separates users into two equal populations, one population is a test group that receives and views an advertisement to be tested, and another is a control group that does not receive or view the advertisement. Then each group is given the opportunity to purchase the product, and the incremental difference between the number of those in the test group who purchase the product versus the number of those who purchase in the control group is the lift.

In this manner, incremental performance may be gauged by the difference in reaction to the ads from users in the treatment group and control group. This helps advertisers to measure the incremental benefits they are getting due to their marketing budgets. In a manner such as this cause and the effect of an advertising campaign can be quantified and used to determine the effectiveness of an advertising campaign. However, there are significant problems with such measuring processes.

Incrementality measurement in online advertising is a complex process. One major problem is that the results of typical incremental lift measurements are often skewed by biases. These biases may be introduced in a wide variety of manners. For instance, bias may be due to the difficulties associated with selecting valid treatment and control groups, ensuring randomization, running the test in a manner that the two groups are treated equally, the market effect, observer bias, and the like. Specifically, another problem is in establishing rigorous causal measurements for determining advertisement effectiveness, so as to be sure that what is being measured is in fact incremental lift. In view of these problems, current modeling is often not sensitive enough to measure incremental lift.

There are, however, various methods that have been advanced for determining the effectiveness of advertising, which includes one or more of the following. For instance, as indicated, it is important for advertisers to know how effective the advertisements they are communicating to the market are having their intended effect of increasing sales. Also as indicated, the fundamental manner by which this is tested is to have a treatment group that receives the advertisement, and a control group that does not see the advertisement, and then presenting both the treatment and the control group with an opportunity to make a purchase. However, if the treatment group sees an advertisement, and the control group sees nothing, then the two groups are not being treated in an equivalent manner, and thus, bias in the test design can occur, and the results may be skewed.

One way to overcome this bias is to show the test group an advertisement, while showing the control group a Public Service Announcement (PSA). Hence, in one testing modality, PSAs are often served to consumers in the control group in place of the actual advertisement to be tested. Particularly, the PSA is employed as a baseline for purchase behavior in the control group of consumers that would have been reached by the advertisements to be tested. For instance, in performing a test for effectiveness, a group of consumer volunteers may be collected and randomly separated into two groups, a first group that is shown a PSA in place of a test advertisement, this group serves as the control, while a second group is shown the advertisement to be tested.

Specifically, from a systems standpoint, the testing is implemented by a server that is configured for running an advertisement display platform, whereby the server communicates with consumer users in the test and control groups via a graphical user interface being presented on a display of a client computing device. The system includes a database that stores both a collection of PSA advertisements, for display to members in the control group, as well as one or more target ads, from the advertiser, to be tested.

Accordingly, in implementing a testing protocol, the system randomly selects a PSA from a number of PSAs in the database, and delivers them to the graphical user interface to be shown to the consumers in the control group. Hence, in the control group, the consumer sees whatever PSA the ad platform randomly chooses to deliver to them when the test ad is absent. However, in the test group, the consumer sees the advertisement being evaluated. After seeing the announcement or advertisement, each consumer may then be presented with the opportunity to make a decision to make a purchase. Alternatively, rather than being presented with an opportunity to make a purchase, their online activity can be tracked or otherwise monitored so as to see if the material they just watched affected their online usage behavior. In these instances, incrementality is calculated by using the conversion rates in both the treatment and control groups. For instance, an experimental ad effect estimator may be used to compare the outcomes of the behaviors of those who see the advertisement versus those who see the PSA.

But, there are several disadvantages to this methodology. First, there is an equivalent cost that is associated with showing the PSA creative to the control group, as both the test advertisement and the PSA would have to be subjected to the external exchange market, and a winning bid would have to be paid for. Additionally, PSA creation and use are prone to errors, in part, because their use requires a large amount of coordination between the commercial business, the advertisers, and the publishers, and further because the typical algorithms for automating in-campaign optimization are not only employed differently between distributing the target advertisement and the PSA to the two different groups, control and test groups, but in view of this, the ad presentation platform selects members for each group differently. Thus, the selection process is not purely randomized. This precludes the necessary symmetry required for validity and causes bias. Specifically, the optimization framework of a Demand Side Platform (DSP) often times automatically optimizes the PSA to users that would likely engage with the creative anyway, which consequently leads to a biased audience between the PSA and treatment groups. These disadvantages de-incentivize their wide scale use.

To overcome some of the bias in the PSA modality, another methodology for determining effectiveness is an intent-to-treat method. In this method, a subset of consumers in one or both the test and control groups are withheld from being shown any ads at all. Consequently, in this instance, incrementality is calculated by using conversion rates that are based on all of the users who would be eligible to see ads in both of treatment and control groups. However, a problem with this methodology is that there is no data collected by which to determine if the withheld population of users would have seen the advertisements in the first place. Hence, this method still leads to biased lift values, and the advertiser may still have to pay for impressions in the control group.

A further methodology employs ghost ads. Similar to PSAs, ghost ads identify the advertiser's ads that would have been among the ads that would have been shown to the consumer had the consumer been in the treatment group, but does not send the advertisement to the external ad exchange, and thus, does not expose the advertisement to the consumer. Typically, the ghost ad methodology is implemented at the ad platform level. Like above, in this method, potential consumers are separated into treatment and control groups, but in this instance, randomly and in real time.

For the control group, although the test advertisement is recorded and present for selection in the database, when the test ad is selected for presentation to the control group, a second "place" or "ghost" ad, e.g., from a different advertiser, is actually substituted and presented in its place. Specifically, in the ghost ad methodology, the ads for presentation to the control group include ads that would have been the target advertiser's ads had the consumer been selected for inclusion as a member in the treatment group, but because they are a member of the control group another advertiser's advertisement is substituted in its place. Hence, because the control group is not being presented with the test ad, they do not see the test ad, instead they see a different ad, e.g., impression, but the system sees and knows that a substitution for a ghost ad impression has been made. The ad platform, therefore, records the data pertaining to the ghost ad impression (which would have been a target ad in the test group) in a system database. This ghost ad impression is important because it allows for the same algorithm to be used to make the target ad presentation decision, but for the control group the target ad is replaced for the ghost ad, and the impression is recorded.

A unique feature of this methodology is that it can be employed whenever consumers can be randomly sorted into control and treatment groups, such as at real time. Hence, in the control group, a consumer is presented whichever ads the ad platform server selects for delivery when the target ad is absent, but the impression is notated as to when the target ad would have been presented. Consequently, unlike the PSA methodology, methodologies implementing ghost ads are compatible with in-campaign optimization, and thus, don't suffer the same deficiencies as PSAs. Therefore, ghost ads determine valid estimates of an average treatment effect on the treated group. Likewise, for this ghost ad methodology incrementality is calculated by using the conversion rates in treatment and control. Such ghost ad methodologies, however, also suffer from many disadvantages.

Specifically, the optimization process can generate unstable lift values due to lack of stability in the number of impressions predicted for the treatment and control group. This is often referred to as the market effect, which results out of the condition that the test ads in treatment have to win a bid opportunity on the open exchange, whereas because in control an ad is not actually served this condition is not present. Consequently, the predicted impression count in control can be different from the actual impression count observed when bidding on the open exchange, such as for the treatment group, and thus, can be different to the proportion of impressions expected in control. This results in an impression bias in control, and thus, the lift analysis may give skewed results.

What is needed, therefore, is a demand side advertisement framework and process that is sensitive enough to measure incremental lift, but configured in such a manner as to account and correct for the above referenced biases, so as to ensure a more accurate measurement of the effect a test advertisement has on a consumer's decision to purchase the advertised product or service. Particularly, in various embodiments disclosed herein below, the present devices, systems and their methods of use described herein solve for these and other such problems. For instance, in particular instances, the present devices, systems, and methods employ an artificial intelligence module that corrects for bias and ensures that the analyses being performed measure the effects to be tested, namely incremental lift that is due to the effectiveness of online advertising.

These factors can be corrected for both at the advertiser platform as well as at the exchange level, and can effectuate both a clean and precise allocation of consumers into both treatment and control groups in a truly randomized fashion. For instance, in various embodiments, once separated into treatment and control groups both impression and conversions rates can be tracked, calculated, and/or applied at one or both the pre- and post-bid level, and the and the resultant incremental lift across these two quantities may be scaled by the win rate in one or both of the treatment and control groups. Hence, in this manner, action through rates (ATR) can be calculated at the bid-level, such as for performing the main lift calculation, but through the application of a machine learning model inaccuracies due to the lift calculation that could typically be introduced via conversion on either side (treatment and control) that are not generated by impressions can be avoided.

SUMMARY

In view of the above, in one aspect, provided herein is a real-time digital advertising selling, bidding, and buying platform that can be employed so as to determine the incremental lift of an advertising campaign, while avoiding the cost and biases inherent to actually serving an advertisement or public service announcement to a control group. These goals may be accomplished, in part, by generating and implementing an intelligent randomization and/or a correction model that corrects for both the market effect as well as auction win bias, and thus, avoids the need to serve ads to and/or identify winner bias types in the control group.

Particularly, in one aspect, a real-time, dynamic ad buying and selling platform is provided. The platform is effectuated or otherwise implemented by an advertisement system server that is configured for communicating and interacting with an advertisement exchange system, such as for participation in a real-time auction, whereby the advertisement system server can evaluate whether to compete for the opportunity to submit a bid for available inventory within which to place an advertisement and thereby present an advertisement to a consumer at real time. This interaction may be conducted directly with the advertisement exchange, or indirectly through a suitably configured demand side platform.

Specifically, in various embodiments, the present advertisement system serer may be configured for evaluating and tracking individual instances of exposing a potential consumer to an advertisement, and/or the impressions and/or conversions that exposure results in, such as with respect to a decision the consumer makes with regard to purchasing the product or service advertised. Particularly, the advertisement server can be configured for quantifying and/or determining the nature of a causal relationship between the exposure of a consumer to an advertisement, and their decision to make a purchase based on that exposure. For instance, as disclosed herein, a causal measurement may be made so as to determine the incremental lift that is caused by the consumer being exposed to the advertisement, whereby the measurement accounts for the difference between a response rate for consumers, e.g., in a treatment group that were exposed to the ad, and made a decision to purchase the advertised product or service, and a predicted response rate for that consumer making that same decision to purchase had they not been exposed to the advertisement. Likewise, the measurement can further be configured to account for the difference between a response rate for consumers, e.g., in a control group, which were not exposed to the ad and either decided not to purchase the product or service, or despite not having been exposed to the advertisement nevertheless made the decision to make a purchase.

This causal measurement, therefore, can measure the degree to which a given decision made by a consumer to buy a product or service was influenced by being exposed to an advertisement. In essence, the measurement determines the extent to which exposure to a given advertisement has on influencing a consumer's behavior in making a purchase, while at the same time attempting to discount for those consumers who would have purchased the product or service regardless of having been exposed to the advertisement.

Particularly, in one specific implementation, the advertisement system may be configured for separating potential consumers into different groupings. A first set of groups may include a first and second group that represent populations of consumers to be exposed to an advertisement, and either decide to make a purchase of a product or service (group 1), represented in the ad, or do not (group 2). A second set of groups may include a third and fourth group that represent populations of consumers that are not to be exposed to the advertisement, and yet either decide to make a purchase (group 3) or do not (group 4). In various instances, one or more of the analyses may be simplified by considering only two categories of potential consumers: those who compose part of a test or treatment group, which group may be exposed to an advertisement to be tested (group 1), and those who are not exposed to the advertisement (group 2). In either of these instances, the response rates in each group can be compared one with each of the others, and the incremental lift due to being exposed to the test advertisement may be calculated.

In various instances, it may be useful for evaluating the same consumer population within each set of groupings. In this instance, either the exposed (test) set or the non-exposed (control) set will include an actual population of consumers, while the alternate set will be composed of a hypothetical population of consumers, identical to those in the other set, but for either having been or not been exposed to the advertisement. In this manner the effectiveness of an advertisement can be measured with respect to its ability to effectuate a change in the behavior of a potential consumer exposed to the advertisement. As indicated above, in particular embodiments, potential consumers need only be divided into two groups, e.g., those in treatment and those in control.

Consequently, in performing the aforementioned incremental lift analysis, an advertisement system server is provided and configured for evaluating the potential lift effect an advertisement has in eliciting a decision of a consumer to make a purchase of an advertised product or service. So being the advertisement system sever includes a network internet connection to communicate with a remote advertisement exchange system server. The advertisement system server is coupled to an advertisement database for storing online advertisement campaigns, each campaign having one or more online advertisements.

Further, the advertisement system server includes a bid processing engine for receiving and evaluating a request for one or more bids, e.g., received from the advertisement exchange server system, where each bid is associated with a consumer and represents the opportunity to submit an advertisement for publishing at a web-based interface of an online publisher and for thereby potentially being viewed by the consumer. Furthermore, the advertisement system server includes a bid matching engine for searching the advertisement database, identifying an advertisement campaign that matches one or more particulars of a bid opportunity, selecting an advertisement from an advertisement campaign for association with a bid opportunity, and for determining a price to make as a bid in response to the bid opportunity.

The advertisement system server also includes a randomization engine that is configured for randomly separating received bid opportunities into either a treatment group ($BR_T$) and a control group ($BR_C$), such as where the randomization engine employs a hash function by which to allocate bids into treatment and control groups. Where the selected advertisement is part of an incremental test campaign then a processing engine of the advertisement server will determine if the bid opportunity is allocated to a treatment or a control group, and if the bid opportunity is allocated to the treatment group, then the system server will determine a bid price, associate the bid price with the advertisement, and submit the same as a packet to the advertisement exchange server for participation in an external bidding process. However, where the selected advertisement is allocated to the control group, the bid opportunity can be recorded and/or stored in an associated advertiser bid database, such as for further processing.

For the bid opportunities allocated to the treatment group, the advertisement system server may include a submission engine that is configured for submitting the advertisement and associated bid package from the treatment group to the advertisement exchange system server to produce a submitted bid for consideration by the advertisement exchange system server. This consideration by the advertisement exchange may include comparing this submitted bid by the advertisement system with other bids submitted by other advertiser systems, such as where the comparing may include performing an auction by which one bid out of all of the submitted bids is selected as the bid winner, and then the advertisement that is associated with the winning bid is transmitted to the publisher for publishing thereby. Once the winning advertisement is received and published by the publisher, the consumer associated with the bid may or may not perform one or more actions with respect thereto, such as by "clicking" on the advertisement, by visiting the webpage of the entity that is the subject of the advertisement, or taking some other action to indicate a provoked interest or disinterest, all of which may be considered activity data ($A_T$), which activity data may be collected and transmitted over the network back to the advertisement exchange server and/or to the advertisement system server.

In various instances, in the performance of one or more of these functions, the advertisement system server may further include an evaluation engine, such as employed by an associated AI module, for receiving activity results data from the publisher and/or ad exchange system server, such as where the activity results data includes one or more data as to whether the submitted bid was won or lost, and if won whether the submitted advertisement was viewed by the consumer (actual impression count $I_T$), and subsequently whether the consumer performed an action in response to having been exposed to the advertisement (actual activity count $A_T$). In particular instances, the evaluation engine may be configured for predicting whether the submitted bid, e.g., treatment bid, would be won upon, e.g., prior to, submission to the ad exchange system, and if won, predicting whether any given consumer would be likely to view the advertisement if exposed thereto (predicted impression count $I'_T$). Likewise, if the bid is won and the consumer is exposed to the advertisement, the evaluation engine can predict whether the consumer would view and/or otherwise act upon having been exposed to the advertisement to produce a predicted view and/or activity result, such as an activity that is attributed to a predicted impression (predicted activity attributed to impression count, or activity count, $A'_T$). The evaluation engine may further be configured for comparing the known activity from a predicted impression, such as the predicted activity attributed to impression result ($A'_T$—predicted activity attributed to impression count), for the treatment group, to the actual activity result (actual activity count $A_T$) with respect to whether the consumer actually viewed the advertisement. This evaluation, therefore, results in a determination of a potential error model that can be used to correct the various analyses herein, such as using $A_T/A'_T$ as a correction factor. Additionally, in similar manner the conversion rate, $A_T/I_T$, can be determined, and the win-rate, $I_T/BR_T$, may also be determined in like manner.

Additionally, the advertisement server system may also include a prediction engine configured for predicting whether the advertisement associated with a bid opportunity in the control group would have been viewed by the consumer, had the advertisement and bid been submitted to the external bidding process and won, so as to produce an inferred-impression count result ($I'_C$). If won the prediction engine may be configured for predicting whether a consumer in the control group having been exposed to the advertisement would have seen the advertisement and/or performed one or more actions with respect thereto (activity attributed to predicted impression count, or activity count $A'_C$). Hence, the evaluation engine is configured for evaluating an advertisement associated with a bid opportunity in the treatment and/or control group, predicting whether the advertisement in the treatment and control group would have won the bid if submitted to an external bidding process, and if won whether the advertisement would have been viewed and/or acted upon by a consumer had the advertisement been published on a webpage being viewed by the consumer. This data may then be employed to produce an inferred-win-rate.

Specifically, the advertisement server system may include a prediction engine configured for using the collected data to generate and apply a predictive top end model to the incoming bid requests in treatment and control so as to predict which bid requests would have been likely to lead to impressions and/or conversions, and thus ranking each bid opportunity by its inferred probability. More specifically, the evaluation engine is configured for applying a win-rate result to the incoming bid requests ($BR_T$) and ($BR_C$), ordering the bid requests by their likely success rate, and then selecting only those bid opportunities having a determined likelihood of winning to the aforementioned incremental lift analysis.

Hence, the advertisement system server may implement an AI module for evaluating an advertisement that is part of an advertisement campaign to be tested, whereby the internal winning bids in one or both of the treatment and control groups are evaluated by the AI module so as to enhance the effectiveness of the incremental lift determination process and thereby generate superior evaluative results. Particularly, the AI module may be configured to generate a predictive model for performing a bid evaluation analysis for weighing bid opportunities. In various embodiments, this lift analysis result may be employed by the system so as to determine the effectiveness of an advertising campaign and/or may be used to determine and/or adjust future bids to be made in response to presented bid opportunities and/or for selecting which advertisements out of a collection of advertisements to be submitted in response to the bidding opportunity, e.g., in response to previously won or lost bid opportunities.

Accordingly, in view of the forgoing, in one aspect presented herein is a predictive system for determining incremental lift of an advertisement, such as a media rich advertisement, in a treatment group that is submitted to an advertisement exchange server, such as in response to a bid request, over the media rich advertisement in a control group that is not submitted to the advertisement exchange. Particularly, the system may include one or more client computing devices for generating media rich advertisements, where the advertisements may have embedded metadata associated therewith where the embedded metadata may include one or more classifications for categorizing the generated media rich advertisements as to class, type, and the like. The client computing device may include a communications module for transmitting the generated media rich advertisements, such as via a network connection, to one or more server systems, such as a supply side sever and/or an advertisement exchange server. The system, therefore, may include a supply side server, such as for receiving the generated advertisements from the client computing device, such as for running an advertisement campaign, and may include an advertisement exchange server for receiving, e.g., via the network connection, bid requests from publishers having advertisement inventory, where each bid request may be directed to a designated advertisement classification, type, and the like, and may further be configured for transmitting those bid requests to a plurality of supply side servers having advertisements that may be relevant to the bid requests. Hence, the system may additionally include one or more publisher servers as well, such as where the publisher servers are configured for publishing content, which content may include one or more advertisements.

In various embodiments, the advertisement exchange server may be configured for performing one or more of the following steps for conducting an advertisement bidding process. First, it may transmit, over the network connection, a received bid request to a plurality of supply side servers in response to receiving the bid requests, and may then receive bids and bid associated media rich advertisements in response to the transmitted bid request. As indicated, in various instances, the bid associated media rich advertisements may be classified according to the designated advertisement type, which advertisement type may be determined by the publisher in the bid request, the advertisement exchange server, and/or the supply side server.

Once the advertisement exchange server has received the bid requests as well as the responsive bids and bid associated media rich advertisements, the advertisement exchange server may then conduct an external bidding process, whereby the received bids are evaluated, and a winning bid and winning bid associated media rich advertisement may be determined. The advertisement associated with the winning bid may then be transmitted, over the network connection, to the publisher for publication of the advertisement, e.g., media rich advertisement.

Likewise, the system may include at least one advertisement supply side server that is configured for performing one or more of the following steps. For instance, the supply side server may be configured for receiving, e.g., via the network connection, media rich advertisements from at least one of the one or more client computing devices, whereby once received, the media rich advertisements may stored in a database, such as a structured database, such as in accordance with each respective advertisement's categorized classification, type, and the like. The supply side server may further be configured for receiving, e.g., via the network connection, a plurality of bid requests from the advertisement exchange server, where the bid request includes a request for an advertisements of a designated by type. In response to receiving the bid request, one or more, e.g., a plurality of, media rich advertisements may be identified and retrieved from the structured database to produce identified media rich advertisements that are of the designated type directed by the bid request. Further in response to receiving the bid requests, an internal bidding process may be initiated where internal bids with respective identified media rich advertisements may be elicited. Consequently, the system may generate a series of bids, which bids may be associated with respective advertisements, and may participate in an internal bidding process to be conducted amongst the identified media rich advertisements where the internal bidding process evaluates the internal bids associated with respective media rich advertisements, and may determine an internal winning bid and associated media rich advertisement for submission to the advertisement exchange server, and then transmit the internal winning bid and associated advertisement to the advertisement exchange server for participation in the external bidding process.

Particularly, in various embodiments, the advertisement supply side server may further be configured for splitting the plurality of bid requests into a first treatment bid group and a first control bid group, and may then designate a version of the identified advertisements to each of the first treatment bid group and the first control bid group, whereby only internal winning bids and associated advertisements from the first treatment bid group will be transmitted to the advertisement exchange server. In various instances, the advertisement supply side server may be configured for and/or may include an artificial intelligence module that is configured for predicting one or both of an initial impression rate and an initial conversion rate for the internal winning bids and associated media rich advertisements of the first treatment group that have been transmitted to the advertisement exchange server to produce one or both of a first predicted treatment group impression rate and a first predicted treatment group conversion rate. The advertisement supply side server may then receive one or both of actual impression data and actual conversion data for the transmitted internal winning bids submitted to the advertisement exchange server for the purpose of determining one or both of an actual treatment group impression rate and an actual treatment group conversion rate for the internal winning bids of the first treatment bid group.

Hence, the advertisement supply side server may further be configured for comparing the first predicted treatment group impression rate to the actual treatment group impression rate, and the first predicted treatment group conversion rate to the actual treatment group conversion rate so as to determine one or both of a treatment group impression error rate and a treatment group conversion error rate. Particularly, the advertisement supply side server may place the internal winning bids of the first treatment group in rank order, such as where the rank order is based on an initial probability that each internal winning bid would become one or both an impression and a conversion. In such an instance, the rank order may have a top portion and a bottom portion, where each portion reflects a relative initial probability that each internal winning bid will become one or both of an impression and a conversion. The top portion and bottom portion can be divided by determining a set point and splitting the group into two portions, such as where the portions may be evenly or non-evenly divided, such as by 50-50, 60-40, 70-30, 75-25, 80-20, 90-10, etc. In such an instance, the treatment group impression error rate and the treatment group conversion error rate may be applied, to the top portion of the ranked based order of the internal winning bids of the first treatment group to produce a second treatment group predicted impression rate, and a second treatment group predicted conversion rate.

In various instances, the advertisement supply side server, e.g., an artificial intelligence module thereof, can use one or both of the second treatment group predicted impression rate and predicted conversion rate so as to determine, using, an initial probability that each bid associated advertisement in the first control bid group, would lead to one or both of an impression and a conversion, if the bid and associated advertisement were to be submitted to the advertisement exchange server for participation in an external bidding process. In such an instance, each bid and bid associated advertisement in the first control bid group can be placed in rank order, such as where the rank order is based on the initial probability that each bid in the first control bid group would become one or both an impression and a conversion. As explained above, the rank order may have a top portion and a bottom portion, where each portion reflects the initial probability that each bid associated advertisement in the first control bid group would become one or both of an impression and a conversion, so as to produce one or both of an initial control group impression rate and an initial control group conversion rate. The treatment group impression error rate and the treatment group conversion error rate may then be applied to the top portion of the ranked based order of the initial control group impression rate and the initial control group conversion rate so as to produce a second control group predicted impression rate, and a second control group predicted conversion rate. The supply side server is further configured for comparing the second treatment group predicted impression and/or conversion rate to the second control group predicted impression and/or conversion rate, e.g., so as to determine the predicted incremental lift of the advertisement.

Accordingly, in view of the above, in a further aspect, an advertisement supply side server may be provided whereby the server is configured for evaluating bid request from one or more advertisement exchange servers, and supplying bids and respective bid associated advertisements to the advertisement exchange server in response to received bid requests. In such an instance, the advertisement supply side server may include a plurality of processing engines for performing one or more steps in an advertisement selection pipeline. Particularly, the advertisement supply side server may include a first processing engine that is configured for storing, e.g., in a structured database, advertisements, such as media rich advertisements, that have been received from one or more associated third party client computing device, such as where the advertisements have been classified according to type, and are stored in a categorical manner that corresponds to the classification of their type.

A second processing engine may also be present for eliciting, in response to the received bid request, internal bids, the internal bids representing a price to be paid for the opportunity to serve a media rich advertisement at a publisher's webpage. Further, one or more additional processing engines may also be present for querying the structured database, in response to an elicitation for internal bids, identifying advertisements having a classification corresponding to a type designated by the bid request, and associating an internal bid with each identified advertisement to produce a set of identified type-based advertisements, e.g., media rich advertisements, each having an associated internal bid for participation in the internal bidding process. Hence, an additional processing engine may be present for conducting an internal bidding process amongst the identified type-based media rich advertisements, such as where the internal bidding process evaluates the internal bids associated with respective media rich advertisements, and then determines an internal winning bid and associated media rich advertisement for transmission and submission to the advertisement exchange server for participation in the external bidding process thereby.

The advertisement supply side server may further include additional processing engines for splitting a plurality of received bid requests into a first treatment bid group and a first control bid group, designating a version of the identified advertisements to each of the first treatment bid group and the first control bid group, and then only transmitting internal winning bids and associated advertisements from the first treatment bid group to the advertisement exchange server. A processing engine for predicting one or both of an initial impression rate and an initial conversion rate for the internal winning bids and associated advertisements of the first treatment group that have been transmitted to the advertisement exchange server may also be included so as to produce one or both of a first predicted treatment group impression rate and a first predicted treatment group conversion rate. Likewise, a further processing engine may be included for receiving one or both of actual impression data and actual conversion data for the transmitted internal winning bids submitted to the advertisement exchange server for determining one or both of an actual treatment group impression rate and an actual treatment group conversion rate for the internal winning bids, and/or for comparing one or both of the first predicted treatment group impression rate to the actual treatment group impression rate, and the first predicted treatment group conversion rate to the actual treatment group conversion rate so as to determine one or both of a treatment group impression error rate and a treatment group conversion error rate.

Additional processing engines may be included for placing the internal winning bids of the first treatment group in rank order, such as where the rank order is based on an initial probability that each internal winning bid would become one or both an impression and a conversion. As described above, the rank order may have a top portion and a bottom portion, where each portion reflects a relative initial probability that each internal winning bid will become one or both of an impression and a conversion. A processing engine for applying one or both of the treatment group impression error rate and the treatment group conversion error rate to all or the top portion of the ranked based order of the internal winning bids of the first treatment group may also be included so as to produce a second treatment group predicted impression rate, and a second treatment group predicted conversion rate.

Further processing engines may be included and configured for determining, using one or both of the second treatment group predicted impression rate and predicted conversion rate, an initial probability that each bid associated advertisement in the first control bid group would lead to one or both of an impression and a conversion, if the bid and associated advertisement were to be submitted to the advertisement exchange server for participation in an external bidding process, and generating a rank order for each bid associated advertisement in the first control bid group based on the initial probability that each bid in the first control bid group would become one or both an impression and a conversion, as described above, so as to produce one or both of an initial control group impression rate and an initial control group conversion rate. One or both of the treatment group impression error rate and the treatment group conversion error rate may be applied by a processing engine to all or to the top portion of the ranked based order of the initial control group impression rate and the initial control group conversion rate to produce a second control group predicted impression rate, and a second control group predicted conversion rate. A processing engine may then compare the predicted impression and/or conversion rate to the second control group predicted impression and/or conversion rate, e.g., so as to determine the predicted incremental lift of the advertisement.

In one aspect, therefore, a process is provided where the process includes a number of the following steps for the purpose determining incremental lift of a media rich advertisement, such as the incremental lift of an advertisement in a treatment group submitted to an advertisement exchange server in response to a bid request, over the advertisement in a control group that is not submitted to the advertisement exchange server. Accordingly, first, bids may be received, the bids may be split into a Treatment ($BR_T$) and a Control ($BR_C$) group, such as by operation of a hash function. In such an instance, bids in the treatment group may be submitted to an external advertisement exchange, such as for participation in an external bidding process. In some instances, prior to submission to the external exchange, an internal bidding process may be conducted so as to determine the winning bid that is to be submitted to the external ad exchange. Data pertaining to the performance of the treatment bids on the open exchange and/or if published at the publisher's webpage may also be collected and/or otherwise received, such as data regarding the number of bids that become impressions and/or conversions. Consequently, the actual impression rate for the advertisements and associated bids in the treatment can then be determined, such as by dividing the number of bids in the treatment group ($BR_T$) submitted to exchange by the number of impressions ($I_T$), and then the probability (P) of a bid becoming an impression may be determined.

In this manner, a predictive model may be generated and trained so as to develop predictive data that may be applied to the initial and/or predicted impression and/or conversion data. For instance, a machine learning model may be trained in a manner to improve a process for making predictions so as to predict the probability (P) of bid requests in the treatment group $BR_T$ also appearing in in the actual impressions served in the treatment group ($I_T$). The probability (P) may then be used to predict which bids in treatment that will become impressions: ($I'_T$). For example, the machine learning model may assign a probability of a bid request becoming an impression to each bid request. The top "n" bid requests with the highest probability of being an impression may then be selected for such that n is the number of actual impressions ($I_T$).

Once the predictive model has been developed and tested, such as by applying the model to the test group, then it may be applied to the bids and associated advertisements in the control group, so as to determine a predicted impression and/or conversion rate in the control group. For instance, the predictive model may be applied to the bids in the control group ($BR_C$) to determine a predicted impressions in control ($I'_C$). Particularly, the machine learning model may assign a probability of a bid request becoming an impression to each bid request, and the top m bid requests with highest probability of being an impression can be selected for, where the ratio of m to n may be the same as the percentage of bid requests in control to treatment.

Next the conversions of the predicted impressions can be determined, such as by utilizing the data to estimate the conversions/actions. For instance, the received actual impression data in treatment ($I_T$) that became actual conversions ($A_T$), e.g., actual actions, may be determined and/or otherwise be received, and this data may be compared to the predicted data, e.g., the number and identity of the impressions in Treatment ($I'_T$) that were predicted to become conversions, e.g., actions ($A'_T$). For example, this comparison may be performed so as to determine an error factor that may be applied by the machine learning module so as to inform the predictive model. Particularly, the predicted conversion/action data ($A'_T$) can be compared with the actual actions data ($A_T$) so as to determine and/or otherwise calculate an action error factor ($E_A$) such as where the error factor ($E_A$) may be determined by dividing the actions in treatment ($A_T$) by the predicted actions in treatment ($A'_T$). This determines a possible error that the initial prediction model made when calculating the predicted actions compared to the actual action data, assuming that the predicted model will also make the same error when calculating the actions in the control group.

This data may then be used to determine the identity and/or number of impressions that were predicted as in control ($I'_C$) that will become conversions, e.g., actions ($A'_C$), such as to determine the predictive incremental lift. For instance, lift may be determined by dividing the conversion rate in treatment by the conversion rate in control. In this instance, the conversion rate in treatment may be determined by dividing the predicted actions in treatment ($A'_T$) by the predicted impressions in treatment ($I'_T$). And the conversion rate in control can be determined by dividing the predicted actions in control ($A'_C$) by the predicted impressions in control ($I'_C$). The error corrected predictive incremental lift may then be determined by applying the error factor to the conversion rate data in control. Particularly, the lift error correction may be determined by dividing the actual conversion rate in treatment ($A_T$) by the error corrected conversion rate in control ($E_A A'_C$). More particularly, corrected lift error may be determined by dividing the predicted actions in treatment ($A'_T$) by the predicted impressions in treatment ($I'_T$) and taking that quotient, and dividing it by the quotient that results from dividing the predicted actions in control ($A'c$) after being multiplied by the error factor ($E_A$) by the predicted impressions in control $I'_C$. This error corrected lift determination gives a bias-free estimate of the effect of the machine learning model as applied to the treatment group compared to the control group where no ads were served.

In view of the foregoing, in another aspect, a computer-implemented method for determining incremental lift based on one or more bid requests may be provided. The method may include one or more of the following steps. For instance, in a first step, a first computing system may receive a plurality of bid requests that are transmitted, e.g., over a network interface, to the first computer system by a second computer system, where each of the plurality of bid requests are directed to a bidding opportunity presented at the second computing system. The first computing system may split the plurality of bid requests into a first treatment bid group and a first control bid group, where the first treatment bid group includes first and second treatment bid lots. The computing system may then associate a first version of an advertisement of an ad campaign of an advertiser, to both of the treatment bid group and the first control bid group, but in various instances may only submit, e.g., over the network interface, the first treatment bid lot to the second computer system, such as for participation in a first bidding process.

As described herein, an external bidding process may then be conducted, and if won the bids in the treatment group may be published and/or viewed at a publisher's website. The first computing system may then receive first treatment impression data ($I_{T1}$) pertaining to whether the bids in the first treatment bid lot were winning bids that won the first bidding process, and whether having won the bidding process the advertisement associated with the winning bids was converted to a first impression. Using the first treatment impression data the first computing system may then determine a first treatment impression rate for the first treatment bid lot, which may then be used to produce a first probability of a bid in treatment becoming a treatment impression. Next, the first impression rate may be applied to the second treatment bid lot to produce a set of initial predicted treatment impression data ($I'_{T1}$, where the set of initial predicted treatment impression data ($I'_{T1}$) represents the probability of a second bid in the second treatment bid lot becoming a second impression.

In such an instance, the first version of the advertisement of the ad campaign of the advertiser may be associated to the bids in the second treatment bid lot, and the second treatment bid lot and associated advertisement may be submitted to the second computing, system by the first computer system, for participation in a second bidding process, and like in the first instance, an external bidding process may take place and the results data forwarded or otherwise retrieved by the first computer system. For instance, second treatment impression data ($I_{T2}$) may be received, such as where the data pertains to whether the bids in the second treatment bid lot were winning bids that won the second bidding process, and whether having won the second bidding process the advertisement associated with the winning bids was converted to a second impression. The second treatment impression data ($I_{T2}$) may then be compared with the initial predicted treatment impression data ($I'_{T1}$) to produce an impression error rate, such as where the $ER_1$ is determined by dividing the actual impression data for treatment ($I_{T2}$) with the initial predicted treatment impression data ($I'_{T1}$)]. The impression error rate may then be applied to the first probability of a bid in treatment becoming a treatment impression to produce a corrected impression probability [$CIP_I$], where the corrected impression probability represents the probability that any further bid will be converted to a further impression.

The computer-implemented method may further include applying the corrected impression probability [$CIP_I$] to a subsequent treatment bid lot to produce a rank based order of each subsequent treatment bid of the subsequent treatment bid lot, where as described above the rank based order may have a top portion and a bottom portion, and the top portion of the rank based order represents those subsequent treatment bids of the subsequent treatment bid lot having a greater probability of being an impression. The first computing system may then select the top portion of the rank based order of subsequent treatment bids to produce a set of final predicted treatment impression data [$I'_{TF}$]. In such an instance, the corrected impression probability [$CIP_I$] may then be applied to the first control bid group to produce a rank based order of the control bids in the first control bid group, such that the rank based order has a top portion and a bottom portion, where the top portion of the rank based order represents the bids in control having a greater probability of being an impression, and the top portion of the rank based order of bids in control may be selected to produce a set of final predicted control impressions [$I'_{CF}$].

The method may further include the first computer system receiving the first actual treatment conversion/action data, where the first actual treatment conversion/action data pertains to whether the bids in the first treatment bid lot that won the bidding process further became a first conversion (All), the first conversion representing a recorded action taken by a consumer having seen the associated advertisement. Using this first actual treatment conversion/action data a first treatment conversions/action rate for the first treatment bid lot may be determined. The determined first conversion/action rate may then be applied to the second treatment bid lot so as to produce a set of initial predicted treatment conversion/action data ($A'_{T1}$), such as where the set of initial predicted treatment conversion/action data ($A'_{T1}$) represents a first probability of a bid in the second treatment bid lot becoming a second conversion.

Hence, the method may further include receiving, by the first computer system, second treatment bid lot conversion/action data that pertains to whether the bids in the second treatment bid lot not only won the bidding process, but also were converted to a second conversion to produce actual second treatment bid lot conversion data ($A_{T2}$). This actual second treatment bid lot conversion data ($A_{T2}$) may be compared with the initial predicted treatment conversion/action data ($A'_{T1}$) to produce a conversion/action error rate, where $ER_1$ may be determined by dividing the actual second treatment bid lot conversion data ($A_{T2}$) by the initial predicted treatment conversion data ($A'_{T1}$).

The determined conversion/action error rate may be applied by the first computing system to the first probability of a bid in the second treatment bid lot becoming a second conversion/action, so as to produce a corrected conversion/action probability [$CP_I$], where the corrected conversion/action probability represents the probability that any further bid impression will be converted to a further conversion/action. The corrected conversion/action probability [$CCP_I$] may then be applied to the subsequent treatment bid lots to produce a rank based order of each subsequent treatment bid of the subsequent treatment bid lot, where a top portion of the rank based order represents those subsequent treatment bids of the subsequent treatment bid lot having a greater probability of being a conversion/action, and may be selected to produce a set of final predicted treatment conversion/action data [$A'_{TF}$].

The corrected conversion probability [$CCP_I$] may then be applied to the first control bid group to produce a rank based order of the control bids in the first control bid group, the rank based order representing the bids in control having a greater probability of being a conversion/action. As above, the top portion may be selected to produce a set of final predicted control Conversion [$A'_{CF}$]. An actual conversion/action rate in treatment may then be determined, where the conversion/action rate in treatment may then be determined by comparing the final predicted action data in treatment [$A'_{TF}$] with the final predicted impression data in treatment [$I'_{TF}$] so as to determine the predicted conversion/action rate in treatment. A predicted conversion, where the predicted conversion/action rate in control is determined by the first computer system comparing the final predicted conversion/action data in control [$A'_{CF}$] with the final predicted impression data in control [$I'_{CF}$], so as to determine the predicted conversion/action rate in control.

The predicted incremental lift of the advertisement may then be determined by the first computing system where the predictive incremental lift may be determined by comparing the actual conversion/action rate in treatment with the predicted conversion/action rate in control. An error corrected conversion rate in control may then be determined, where the error corrected conversion rate in control may be determined by applying the conversion/action error rate to the final predicted conversion/action data in control [$A'_{CF}$] to produce error corrected predicted action data in control. The error corrected predicted action data in control may then be compared with the final predicted impression data in control [$I'_{CF}$] to produce an error corrected conversion rate in control. An error corrected incremental lift may then be determined, where the error corrected incremental lift is determined by comparing the actual conversion/action rate in treatment with the error corrected conversion rate in control to produce the error corrected incremental lift.

Accordingly, the methods, devices, and systems provided herein may be employed to predict impressions in the treatment group and control group based on a determined machine learning model that is unique as it ranks all the bid requests based on their probability to become impressions and only selects the top n bid requests where n is the same as the number of impressions in treatment group. This ensures that the predicted treatment impressions are comparable to the actual impressions. The same ratio in the control group may be maintained by selecting the top m bid requests most likely to become impressions. This likewise ensures that the predictive model generates the same number of impressions that mimics the real world.

It is assumed that the machine learning model will need to be trained and, thus, errors may occur when performing initial predictions of impressions and/or conversions from bid requests. These errors may be corrected for by employing an error correction factor EA. EA represents the error introduced when determining actions based on predicted impressions to actual actions that occur due to actual impressions. The closer the predicted impressions and/or conversions are to the actual impressions and conversions, the more accurate the predictive model is. Hence, one or more of the aforementioned steps may be repeated to error correct the predictive model until a determined level of accuracy has been determined. As indicated, the error factor may be calculated based on the ratio of the actual actions to actions that would have occurred in the predicted impressions. Since the same prediction model that is used in the treatment group is used in the control group, it may be used to assume that the error factor in the control group would be the same as the treatment group. Hence, when determining the predicted actions in control group, the results can be error-corrected by multiplying them with the error factor observed in the treatment group.

The summary of the disclosure described above is non-limiting and other features and advantages of the disclosed apparatus and methods will be apparent from the following detailed description of the disclosure, and from the claims.

DETAILED DESCRIPTION OF THE DISCLOSURE

Figure 1:
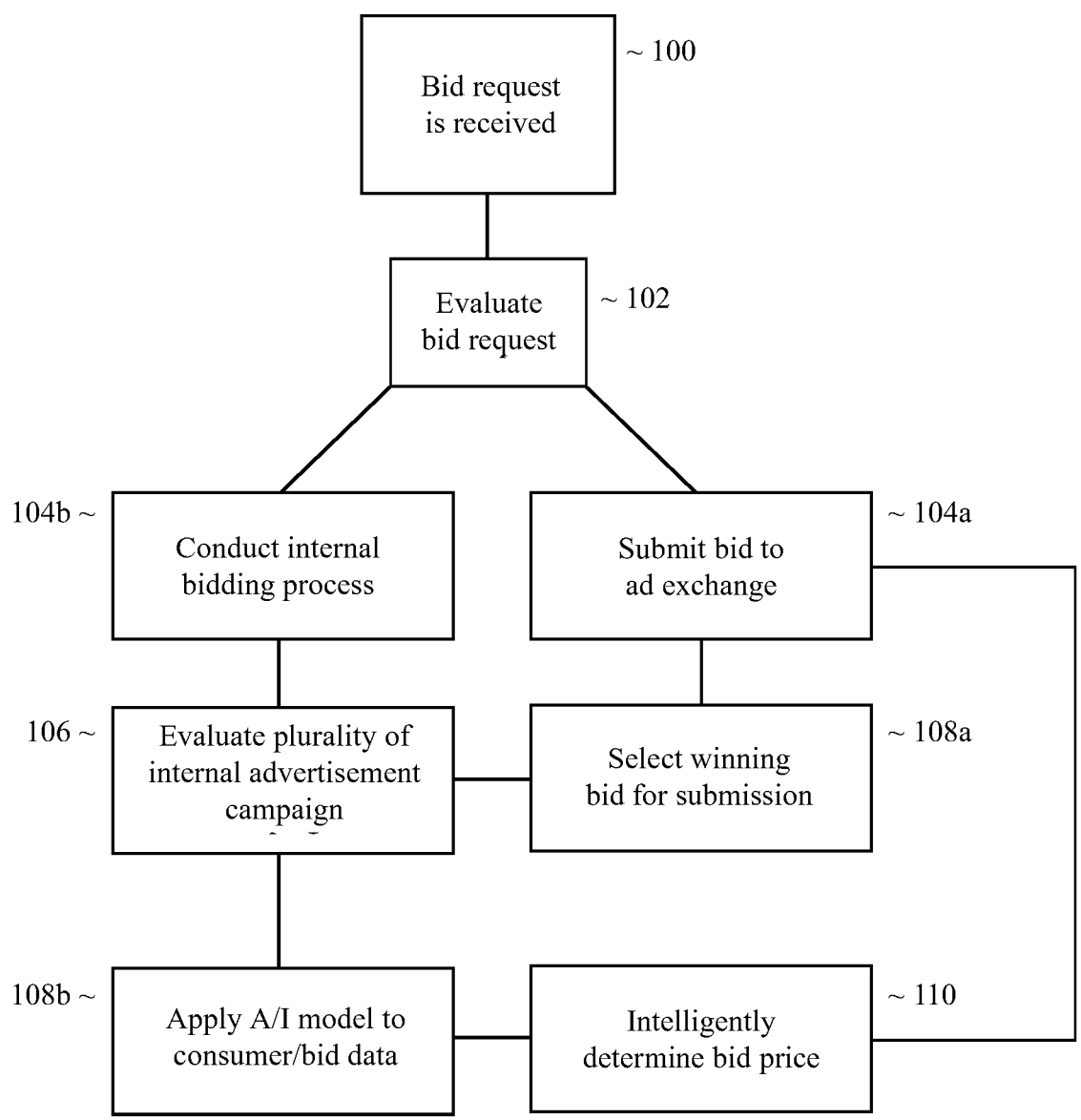
FIG. 1 illustrates a flowchart for an internal advertisement bidding process in accordance with the teachings of the disclosure presented herein.

The present disclosure is directed to devices, systems, and their methods of use for evaluating and optimizing the effectiveness of digital advertisements to increase sales such as in a digital ad-buying platform. Particularly, disclosed herein is a digital ad-buying platform that can determine incremental lift in a manner that reduces bias and provides for more precise and accurate lift analysis.

Hence, in various instances, implementations of various aspects of the disclosure may include, but are not limited to: apparatuses, systems, and methods including one or more features as described in detail herein, as well as articles that comprise a tangibly embodied machine-readable medium operable to cause one or more machines (e.g., computers, etc.) to result in operations described herein. Similarly, computer systems are also described that may include one or more processors and/or one or more memories coupled to the one or more processors. Accordingly, computer implemented methods consistent with one or more implementations of the current subject matter can be implemented by one or more data processors residing in a single computing system or multiple computing systems containing multiple computers, such as in a computing or supercomputing bank.

Such multiple computing systems can be connected and can exchange data and/or commands or other instructions or the like via one or more connections, including but not limited to a connection over a network (e.g. the Internet, a wireless wide area network, a local area network, a wide area network, a wired network, a physical electrical interconnect, or the like), via a direct connection between one or more of the multiple computing systems, etc. A memory, which can include a computer-readable storage medium, may include, encode, store, or the like one or more programs that cause one or more processors to perform one or more of the operations associated with one or more of the algorithms described herein.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter. As used herein, unless otherwise stated, the singular forms "a," "an," and "the" include plural reference.

Accordingly, in one aspect, presented herein are systems, apparatuses, and methods for optimizing and effectively implementing a dynamic, real-time, digital ad-buying platform that is configured for determining the incremental lift that results when a consumer is exposed to an online advertisement. Online advertisement creation, generation, and distribution is a multibillion-dollar industry that is largely centered around programmatic creative. Programmatic creative refers to a set of rules based advertising technologies that include advertisement production, dynamic advertisement generation, as well as creative optimization. Specifically, programmatic creative is the build and deployment side of online advertisement marketing.

However, once an advertisement is built and prior to its deployment at a web based interface, it enters into a bidding process, whereby it has the opportunity to win the bid and be deployed. This bidding process is known as real-time bidding and refers to the selling and buying of online advertisement inventory through a real-time auction process. Such online bidding is typically effectuated by buy-side platforms submitting bids on an ad exchange. For instance, from a systems perspective, the advertisement agency includes a system server that employs an advertisement generation and/or distribution server that generates and/or stores advertisements for distribution to one or more publishers for publication thereby, such as when a bid is won. This advertisement system server, therefore, is configured for receiving inventory information, such as from one or more publishers, analyzing the information in comparison with information pertaining to advertisements available for publication, and determining whether to make a bid to place an advertisement on the publisher's website. Likewise, the publisher also includes a system that employs one or more servers such as a content server that is configured for publishing content, but also an advertisement server for receiving a bid related to the posting of an advertisement, appraising the bid, and posting the advertisement, such as via the content server, where the bid is a winning bid.

In various instances, the advertisement system server can communicate directly with the publisher server, and a bidding exchange can occur directly. However, often times the bidding occurs through the intermediary of an ad exchange server. For instance, in various instances, the ad exchange server may implement a demand side platform (DSP) that is configured for connecting the buyers and suppliers of digital advertising inventory in such a manner so as to effectuate the selling and buying of advertising space, such as in a bidding, e.g., real time bidding, process. For example, in a particular instance, real-time bidding for displaying online advertisements takes place within the ad exchange server, and by utilizing the demand side platform (DSP), exchange operators can manage both the data pertaining to bids for advertisement placement and the data pertaining to pricing a bid, which data may be layered so as to more efficiently facilitate the exchange process, all from a single interface.

In certain instances, the DSP optimizes this process by allowing a large number of advertisement providers to exchange with a large number of content suppliers in a manner that allows for consideration of various key performance indicators that optimizes the transmission of data that can be evaluated when deciding whether to make and/or accept a bid. These performance indicators may include characteristics regarding the nature of the advertiser, the advertisement, the publisher, and the potential consumer. Particularly, these indicators may include effective cost per click and cost per action indicators.

Accordingly, as a webpage, such as a publisher's webpage, loads into a user's browser, available inventory, such as unused space on the boarders of the page, may be auctioned off to advertisers and/or other programmatic creatives looking to place ads on their webpage, such as in a real time bidding auction. As indicated, the auctioning involves an evaluation of a number of factors including the type of online content provider, e.g., publisher, the type of user, e.g., consumer, seeking to access the publisher's webpage, the consumer's online browser history, e.g., indicating their interests, search history, records of online transactions made, and the relevance of the goods and/or services of the advertiser to one or both of the publisher and the potential consumer.

For example, if the online consumer has performed prior searches for athletic equipment, and is now seeking to access a sports based content providing publisher, an advertiser of sporting equipment may provide a bid for available inventory on the publishers webpage that accounts for each of these factors. In such an instance, the sports equipment advertiser will likely be willing to make a higher bid to win access to providing an advertisement to this consumer than would an advertiser selling phone cases. These advertisement opportunities being sold are auctioned off to the highest bidder, and when an advertiser wins the bid, the advertisement once published is referred to herein as an impression, and the price of the impression is determined in real time by the bidding process conducted by the advertisement exchange. Once a bid is won, the winning advertisement is deployed.

After deployment, it is important for the advertiser to determine the effectiveness of the generated advertisement to actually convert advertisement impressions into actual sales. Such testing is useful because in the dynamic advertising space, a plurality of advertisements may be generated, such as in substantially real-time and distributed to a plurality of different users in a manner such that the advertisements are catered to the consumer's characteristics. Particularly, where an advertisement is generated based on the characteristics of a potential consumer, real-time testing can be employed so as to determine the effectiveness of the advertisement for convincing that particular consumer to buy the advertised good or service. Further, even when the advertisement is not dynamically generated and/or specifically catered to a particular consumer's characteristics, the advertiser may have a number of different advertising campaigns going on, and may want to determine which ads of which campaigns are performing better than the others.

Particularly, the advertiser may want to know which advertisement views, e.g., impressions, lead to sales, e.g., conversions. In some instances, the advertiser may simply want to know how effective a given advertisement is for increasing sales. In such instances, those advertisements that are tested and proven to do well within a given user demographic can be deployed more often, e.g., given more weight, and those that do not perform as well can be deployed less often, e.g., weighted lower. In this manner, the advertiser can deploy advertisements that are proven to be more precisely designed to convert consumer impressions into sales.

Accordingly, such weighting can be employed in predicting and/or determining the effectiveness of a given advertisement to a particular consumer group, which may be used in determining whether or not to make a bid for any given new consumer in a relevant advertising space or not. This is of particular usefulness because advertisers do not want to waste money paying for a bid that is not likely to convert into a sale.

Particularly, it is important for advertisers, as well as the companies that employ them, to know that it is the advertising spend that drives the desired consumer behaviors. In particular, advertisers want to know that the consumer's decision to buy a product online occurred as a result of the placement of an online advertisement such that it was the impact that the ad made on the consumer that was the true cause behind their decision to make a purchase, e.g., the consumer was persuaded to make the purchase as a result of the advertising. More particularly, the advertiser wants to ensure that the incremental lift discounts for consumers that would have made the purchase anyway, and not as a result of the advertising. Hence, what is needed is a process for determining incremental lift, without the extra cost of paying for advertisements to be shown to the control group, but there is difficulty in determining how those in the control would have responded had they been shown the test advertisement. The present system enables a determination of lift without the cost of serving advertisements to members in the control group.

However, there are several issues that result in structuring an incremental lift analysis in these contexts, such as bias that occurs if a test bid is sent to an ad exchange server, but it is not won, such as in the case of being outbid by a different market participant bidding on the same opportunity. In such an instance, the advertisement associated with the losing bid in the treatment group will not be seen. Nevertheless, because a bid is never sent to the ad exchange server for the advertisement in the control group, thereby saving the cost for this portion of the test, there is no chance for a bid in control to be lost on the open market, and thus, this open market effect leads to a higher potential positive result in the control group than would otherwise be possible for the treatment group, leading to a bias for the control. Specifically, without correcting for these biases the results in control would tend to elevate the number of control group bids that can be evaluated for becoming an impression and/or conversion. Hence, herein presented is a lift determining model that corrects for these and other biases that represents a more realistic representation of the open market. Specifically, the model presented herein accounts for this market effect bias by more precisely considering how the open market actually behaves, such as in the treatment group, and then applying the particulars of those market behaviors to the control group in such a manner that it can better be determined how those in the control group would behave in a real market environment.

More specifically, as can be seen with respect to FIG. 1, the present model presents a live, real-time test environment, which includes one or more of the following steps. First, at step 100 a bid request representing an opportunity for presenting an advertisement is transmitted by an ad exchange server, and received at an advertisement server. At step 102, once the bid request is received at the advertisement server, the advertisement server may evaluate the bid request to determine a bid and an advertisement to be submitted to the ad exchange server in response to the bid request. The process for determining a bid to be submitted from the advertisement system server to the advertisement exchange can be simple. For instance, at step 104*a*, a price to be paid for the bid opportunity may be determined, an advertisement may be selected to be associated with the bid price, and a bid package may be formed and submitted to the ad exchange server for evaluation thereby.

However, in various embodiments, such as at step 104*b*, there may be a plurality of advertisements available to the advertisement server that can be considered for submission, which may be more or less suited to the consumer and/or publisher representing this bidding opportunity. Hence, in such an instance, at step 104*b*, an internal bidding process may be performed by the advertisement server, so as to determine which of the plurality of potential advertisements to associate with a bid in response to the received bid request. In such an instance, at step 106 an internal bidding process may be conducted whereby a plurality of advertisement campaigns can present advertisements to be considered, and internal bids may be made based on the perceived value the consumer represents to their advertising campaign, and from an evaluation of these internal bids, at step 108*a* a winning bid may be selected for submission at step 104*a*.

Specifically, an internal auction may be performed whereby all the advertisers who have campaigns that match the bid request can submit a bid for the opportunity to have one of the advertisements in their campaign be submitted with a bid to the external ad exchange for consideration thereby. This internal bidding process may be implemented based on one or more particulars or characteristics of the consumer and/or publisher, which may indicate to the advertiser the consumer's willingness to purchase a product the advertiser desires to sell. Such characteristic data may include any pertinent data that allows an advertiser to determine a potential willingness of the consumer to purchase a product, such as their online search history, the websites they have visited, how long they have visited those websites, searches for items they have performed, publisher's content they have consumed, prior purchases they have made and the like.

Particularly, there are three general types of information about the consumer that the system can track and collect. The first is contextual level information, which information includes data surrounding the context of the consumer's web-based interactions, such as what websites they visit, what published content they consume, which web searches they perform or from which publisher's website the bid opportunity is elicited, to which ad exchange the bid opportunity is conveyed, and like information. The second type of information is consumer level data, such as the geographical region where the consumer is located, whether the region is an urban or rural environment, what the consumer's demographics are, their income level, and the like. The third type of information collected pertains to which advertisements they see or have seen in the past. This information can include data characterizing the advertisement, the advertiser, the products being sold, and the like, such as through the consumer's history of viewing ads and/or making purchases online. All of this context, consumer, and feature data can be extracted and fed into a machine learning engine so as to determine one or more relationships between the characteristics of the consumer and the types of products they purchase, so as to better predict which advertisements for which products from which manufacturer's the consumer will purchase from again.

More particularly, the advertisement system server may include an artificial intelligence module that functions to collect consumer data so as to identify consumer particulars that can lead them to click on an advertisement when presented, or visit the seller's website, and/or make a decision to purchase the advertised goods, which herein is referred to as a conversion. Essentially, conversion activity can be any form of action taken by the consumer that any given advertiser running a campaign considers important in their evaluation process of whether to make a bid or not, and/or for how much to bid.

Accordingly, conversion data, e.g., which advertisements lead to a conversion, is of particular import to the system and the evaluation processes it performs. In many instances, this information may be stored as cookies on the consumer's client computing device. Consequently, this data may be collected and can be associated with the bid request, whereby when implementing each unique advertisement campaign, the A/I module can evaluate the consumer data associated with a bid request, make an internal evaluation as to the likelihood that this consumer may purchase a product to be sold if shown an advertisement based on that product, and thereby, at step 110, intelligently determine the price to submit as a bid to the internal auction at step 104a. In this manner, any of the internal advertisement campaigns of the advertisement system server can perform an analysis of the consumer and decide whether and how much to bid for each particular bid opportunity that comes into the system from the ad exchange.

As indicated, in particular instances, this internal evaluation may be performed by a suitably configured artificial intelligence module that is adapted for considering the consumer data in relation to the various product offerings of the various advertisement campaigns running on the advertisement system server, so as to predict a likelihood of successfully selling a product to this consumer by showing the consumer an advertisement, and then making a bid based on that predicted outcome, whereby the bid represents a monetary value of the confidence the advertiser has of effectuating a sale by winning both the internal and external bidding process and thereby presenting an advertisement to the consumer associated with the bid opportunity.

After being exposed to the advertisement, the consumer's later activity can be tracked and the results of that activity, e.g., whether the consumer actually visits the webpage of the advertiser and/or makes a purchase, can be transmitted back to the advertiser system server so as to form one or more data points for evaluating future bid opportunities represented by that consumer, such as by one or more of the AI modules of the system. This later activity by the consumer can be referred to herein as attribution, and can be used by the AI module of the system so as to determine the likelihood a consumer representative of a bid opportunity will convert for an advertiser.

In a manner such as this, it can be determined or otherwise inferred whether the consumer's decision to visit the web site of the advertiser and/or make a purchase is due to their having been presented with an advertisement, e.g., if it was the consumer's viewing of the advertisement that is attributed to their decision to visit the advertisers website and buy the product. This data may then be used by individual advertisement campaigns of the advertisement system server for the purpose of determining how much money to bid on a bid opportunity. Particularly, as explained above, the system may implement an internal bidding process, prior to submitting a bid to the external exchange, such as where the internal bidding process is performed so as to determine how much each of the internal advertisement campaigns is willing to bid so as to win the opportunity to place a bid at the external auction.

In placing such a bid, a great concern of the advertiser is to know how effective their advertisements are for positively influencing the consumer to make a purchase, so as to better determine going forward, how much money to place on bidding opportunities. Accordingly, the devices, systems and their methods for determining incremental lift, as disclosed herein, is of particular interest to advertisers, and thus, as explained below it is important to be sure that the methodologies for determining incremental lift measures the effect, e.g., lift, that such studies are designed to measure. In view of this, the present systems are configured for determining lift in a manner that assures the effect being measured is due to the advertisement and not to any other factors. This is assured in part by the way the system distributes bid requests into treatment and control groups, how the system corrects for market effect and other biases, as well as by applying a top end filter to ensure the most pertinent results are being measured.

Once a bid is placed and won, on the external exchange, then the consumer's activities after having been exposed to the advertisement can be tracked, such as with respect to their conversion for the advertiser, and the data collected, e.g., impression and/or conversion data, can be transmitted back to the advertisement system server for consideration thereby in evaluating new bidding opportunities, such as by the A/I module of the system. Consequently, both the internal and external bidding process set forth in FIG. 1, as conducted by the advertisement system server, may be implemented so as to train the system to more accurately determine, at step 110, how much monetary value to associate with a bid opportunity by any given advertisement campaign being run in a manner that reflects the probability of producing a conversion of the particular bid requests by exposing the associated consumer an advertisement. In this instance, the greater the probability that any given bid opportunity will lead to a conversion for the advertiser, the more that advertiser will be willing to pay for the opportunity to serve the associated consumer an advertisement, and this is how the internal bidding system runs.

Figure 2:
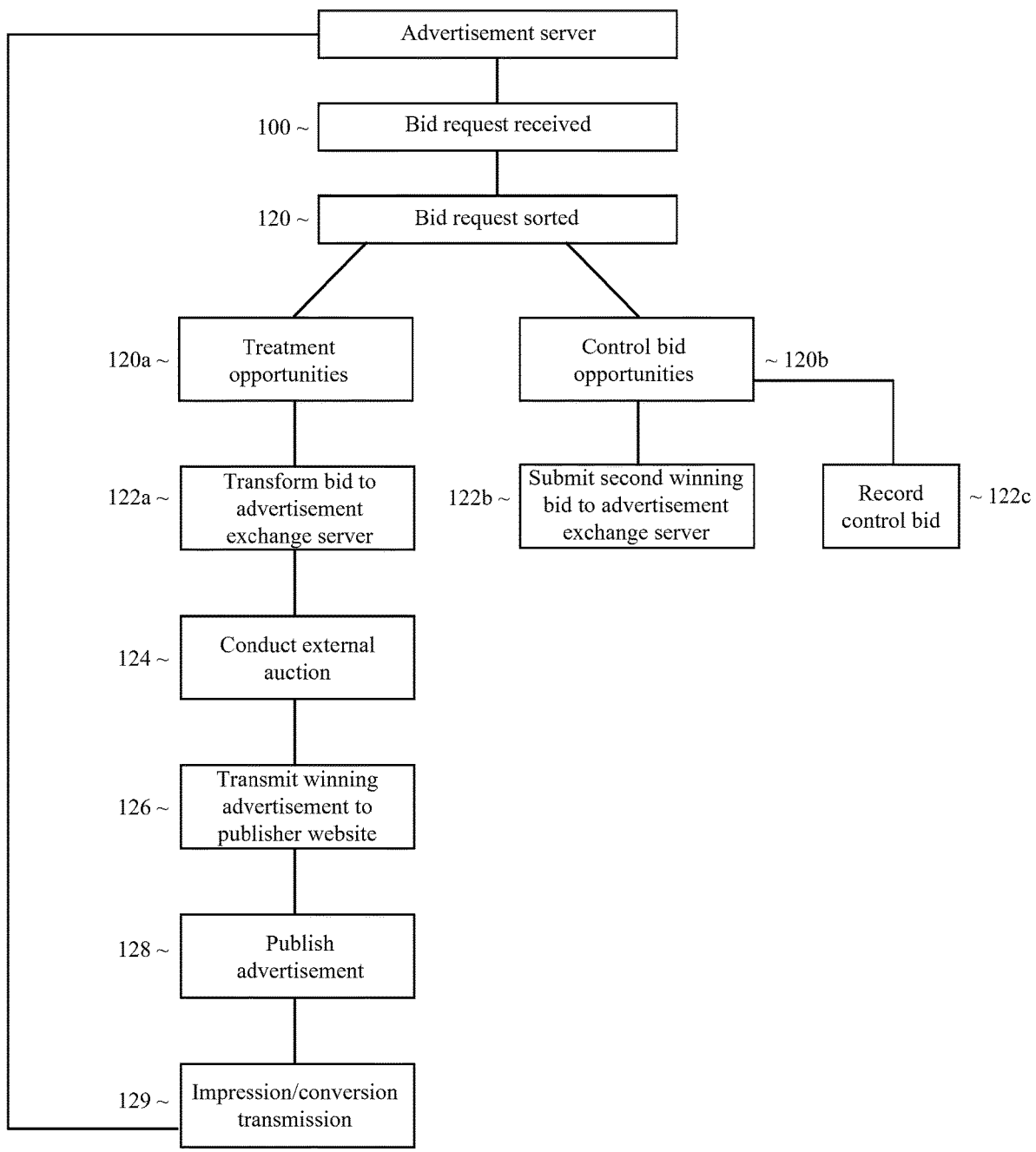
FIG. 2 illustrates a flowchart for an external advertisement bidding process in accordance with the teachings of the disclosure presented herein.

In view of the above, in one particular aspect, the present disclosure is directed to performing an incrementality lift analysis for an advertisement campaign, such as on bid requests that are transmitted by an advertisement exchange server to the server of an advertisement system. Accordingly, as can be seen with respect to FIG. 2, when performing an incremental lift determination, at step 100, bid requests are received. At step 120, when the bid requests are received by the advertisement system server, they are sorted by a hash function into treatment 120a and control 120b groups by an identification of the consumer associated with the bid. Specifically, the hash function may be configured to initially designate consumers randomly into treatment and control groups, such as based on their user or system ID's.

Typically, this separation into treatment and control groups may be effectuated by a combinatorial engine applying a hash function to the incoming bids, such as based on the consumer identification designation (User IDs) associated with the incoming bid opportunities. Once designated, the combinatorial engine further functions to ensure that any particular User ID gets properly placed in the control or treatment group consistently over time, regardless of when and during which visit any given previously designated user, e.g., consumer, becomes associated with a new bid opportunity. In this manner, a given consumer is designated to a treatment or control group and remains in that group throughout all of their online consuming experiences over time.

Consequently, when a bid request comes in, if the associated advertisement for the bid that wins the internal auction is part of an incremental lift test campaign, then one or two things may happen. If the bid request is assigned to the treatment group 120a, then at step 122a the advertisement whose associated bid wins the internal auction gets transmitted to the advertisement exchange so as to participate in the external bidding auction. However, at step 122 if the bid request is assigned to the control group, the advertisement whose associated bid wins the internal auction does not get transmitted to the advertisement exchange, and does not participate in the external auction. Instead, at step 122b the advertisement for the second winning bid may at step 124 be submitted to the ad exchange for participation in the external auction, and the advertisement for the winning bid can be subjected to the herein presented incremental lift determination process.

It is to be noted that, in one embodiment, all incoming bid requests may be immediately assigned to either a control and a treatment group, regardless of whether the advertisement campaign that wins the internal bid is part of a test campaign. However, in another embodiment, the bid requests are separated into control and treatment only after it is determined that the advertisement of the winning internal bid is part of a test campaign. In either instance, once separated into treatment and control groups, those advertisements in the treatment group 122a that are running an incrementality test, and which win the internal bid, may at step 124 be submitted to the external advertisement exchange so as to participate in the external bidding process, whereby if at step 124 the submitted advertisement wins the external bidding process, then at step 126 the advertisement that won the bid will be transmitted to the publisher's website, which once received at the publisher's server, at step 128, the advertisement will be posted on the publisher's website for presentation to the consumer. In this manner the consumer associated with the bid opportunity will be exposed to the winning advertisement. Likewise, where the presentation of the advertisement leads to an impression and/or conversion, at step 129, that information may be sent back to the ad exchange server and/or to the advertisement system server for consideration thereby.

Once received by the advertisement system server, all of the data collected pursuant to the bidding process, e.g., with respect to the treatment group, may be processed, treated, and analyzed, such as by an A/I module of the system, so as to determine and make one or more predictive inferences about the type of bid opportunities, representing various consumers, that lead to a conversion. For instance, the results of the performed incremental lift determination may be employed in further analyses so as to determine what the probability is of converting any particular impression on an external market for each bid opportunity.

Particularly, as explained herein, an A/I module of the system may include a machine learning (ML) engine and an inference engine, such as where the ML engine is configured for generating and training a model, such as for making an impression or activity prediction, and/or for implementing an incremental lift model, which lift model may then be employed by the inference engine so as to generate a predictive outcome as to each received bid opportunity. For instance, when evaluating bid impressions, those impressions that are predicted to lead to actions are going to receive a higher bid for the opportunity. These analyses, therefore, are important in determining how much should be bid, such as during an internal bidding process, and then determining how effective that bidding was on the open exchange, so as to determine the effectiveness of the overall evaluation process. More particularly, the ML model may be trained based on a number, e.g., the total number, of bridge responses that were sent out to buy ads on the external market to the number of impressions and/or conversions that resulted thereby.

In various instances, the system may also apply one or more filters to better tune the data, such as by filtering out those in the treatment groups who were sent to the external exchange, but did not win the bid, or won the bid, but yet were not published by the publisher, or were published by the publisher but were not viewed by the consumer, or were viewed by the consumer but no further actions were taken thereby, and the like. Hence, the system tracks and employs both bids sent out and bid responses that result therefrom, such as impressions and conversions, as data points in the A/I module, so as to generate a predictive outcome as to the probability that a given bid opportunity will lead to an impression and/or conversion.

Accordingly, these data points, the relationships between them, and the predictive inferences derived from those relationships can be used to generate a model, e.g., a predictive model, that can be applied to the bid opportunities of the control group so as to predict which of the bid requests in the control would have won the bid and/or been presented an advertisement, and/or would have led to a conversion, e.g., would have led to the consumer seeing an advertisement and/or visiting the seller's webpage and/or purchased the advertised product.

Figure 3:
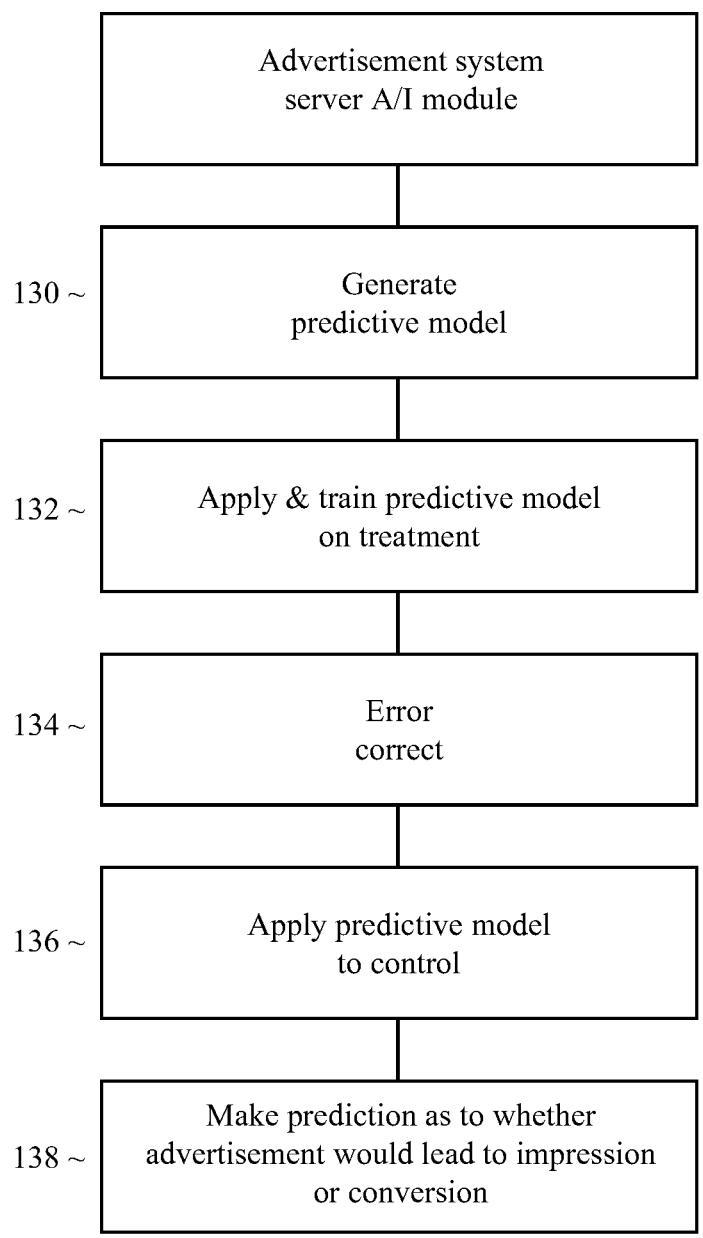
FIG. 3 illustrates a flow chart for the generation of a predictive model for use in determining incremental lift.

Hence, as can be seen with respect to FIG. 3, in various instances, the advertisement system server may include an AI module, which AI module, at step 130, may be configured for generating a predictive model, which predictive model at step 132 may be run on the treatment group, so as to train the predictive model. Specifically, at step 134, an error correction process may be performed so as to fine-tune the training of the model and implement error correction. At step 136, once trained, the predictive model may then be applied to the control group, and at step 138 the predictive model may make a prediction as to whether an advertisement in the control group would have been seen by a consumer, e.g., would have been an impression, if it had won the bidding process, and/or to make a prediction as to if seen would have led to a conversion.

Specifically, the purpose of the control is to determine whether the consumer would have purchased the product of the advertisement even had they not been exposed to the advertisement. Accordingly, running the model on both the treatment and the control groups is useful because it distributes the marketing bias across both the treatment and the control group thereby resolving and correcting for the bias. Once this predictive model has been performed, e.g., on one or both of the treatment and control group, then the conversion rate in the treatment versus the control can be compared so as to determine the incremental lift caused by the advertisement, such as where the incremental lift measures the effect that the advertisement had on the consumer's decision to purchase the product.

More specifically, the predictive model as applied to the control group determines which bid opportunities, e.g., consumers, would have bought the product for reasons other than seeing the advertisement, e.g., they were already predisposed to make a purchase, and thus, the control group represents a baseline. The present predictive model, therefore, can determine which consumers would have seen impressions, had they been in the treatment group. The system then tracks actual activity within these predicted impressions in order to find which consumers would have bought the product for reasons other than seeing the advertisement. Consequently, the model helps to identify a set of control users who would have seen impressions had the bid-response been served.

So being, the predictive model as applied to the control group determines the absolute effect of those who having seen the advertisement actually made a purchase. Thus, the incremental lift is determined by subtracting the baseline, e.g., representing those who would have made a purchase regardless of having seen the advertisement, from the treatment group representing those that actually saw the advertisement and/or made a purchase, the results representing those whose decision to make a purchase is due, at least in part to their having seen the advertisement. Once the predictive results have been generated they may then be used to identify, e.g., by back tracing, which bid opportunities actually led to an impression and/or conversion, and, thus, the advertiser and the seller of goods can thereby determine the effectiveness of different advertisement campaigns. This information can also then be used to better train the internal A/I module for more accurately determining the price a given advertiser should initially make to win a bid opportunity. This sort of measurement can be measured across bid opportunities, impressions, and conversions, and the performance of the advertisement campaign can be determined.

Accordingly, in various embodiments, the present predictive models may be employed by the buy side platform, e.g., the advertisement system server, prior to bid submission to the exchange. However, it is to be noted that although the performance of the present AI module is being described herein as being implemented by the advertisement system server, in various other instances, the AI module may be configured so as to be implemented by the advertisement exchange server, so as to be implemented at the exchange level in addition to, or instead of, being implemented at the internal advertisement system level. In various embodiments, the AI module may be implemented by a publisher system server so as to determine consumer characteristics and correlate them to both impression and conversion rates so as to determine the effectiveness and value of the content being published.

In view of the above, in one aspect, the present disclosure is directed to performing an incrementality lift analysis for an advertisement campaign on one or both of a treatment and a control group in a manner that the advertisement to be tested is not actually shown to the members, e.g., bid associated consumers, of the consumer group, while at the same time ensuring the accuracy and competency of the determined lift results, such as by accounting for the market effect. Hence, as explained herein and below, the advertisement being tested is not actually served to the consumers associated with bids selected to be in the control group. Instead, a predictive model is generated by the ML engine, whereby the consumers in the control group, who would have been bid on, are rather recorded as a data point, e.g., as a control bid, for consideration by the ML platform in generating a predictive model that can then be employed by the inference engine to produce a predictive incremental lift outcome.

Accordingly, to effectuate this incrementality lift analysis, a core of the present technology is the implementation of the aforementioned artificial intelligence module that employs one or more of a machine-learning engine and an inference engine for determining correlations from which one or more conclusions can be inferred, such as conclusions regarding a consumer's predicted actions that result from being exposed to an advertisement, for instance, in the condition of not having actually seen the advertisement. Specifically, when running a test campaign, an internal bidding process is conducted by the advertisement system server, and after a given advertisement campaign wins the internal bidding, then if the winning bid is from a campaign where an incremental lift analysis is to be performed, the consumers associated with the various winning bid opportunities will be divided into a treatment group and a control group. As explained above, an ad will be served to the treatment group who then will potentially have the opportunity to see the ad. However, for the treatment group, even when an ad campaign wins the internal bid, there is no guarantee that the advertisement of the campaign will win the external bid, and even if it does win the external bid, there are still various factors that may prevent it from actually being posted for viewing at the publishers website.

Who actually wins the bid and, therefore, wins the opportunity of the consumer to see the advertisement is dependent on a number of different variables including one or more of the following. For instance, the type of publisher, bid price, ad exchange and publisher criteria all affect whether an advertisement bid wins on the external exchange, and whether if it wins it will be published by the publisher. This creates a bias because in control a real bid is not actually submitted to the external exchange, and so the consumer represented by the bid selected for placement in the control group is not actually served the advertisement that is the subject of the testing. Hence, there is no possibility for a control bid to be lost on the open exchange.

Of course, this could be corrected for by actually submitting the winning bid to the open exchange, but if the bid is won, instead of serving the consumer the test advertisement, they may be served a control advertisement, and incremental lift may be determined thereafter by measuring the difference in response by the consumers who were in control and served a control advertisement, and the response of consumers in the treatment group that were shown the advertisement to be tested. Serving a PSA to the control group, however, is expensive because an actual bid must be made and won on the external exchange for the PSA to win the opportunity to show the PSA to the consumer, and thus, an actual cost for winning the bid is incurred. Additionally, maintaining pristine control and treatment groups is difficult.

Hence, in particular instances, as can be seen with respect to FIG. 3, it is beneficial to not actually submit the bids in control to the external ad exchange server, instead an advertisement from a campaign that wins the internal auction may be recorded, but not served. However, because the advertisement is not served, rather, simply recorded, it is not known which consumers associated with the bids won by the advertisement campaign in the control group would have actually seen the advertisement had those bid opportunities, and the consumers associated therewith, been in the treatment group. Accordingly, in order to determine which consumers in the control group would have actually been presented with an advertisement, e.g., had their associated bid opportunity been in the treatment group, and/or which of these consumers would have become an impression or conversion, an A/I module associated with the advertisement server system may be employed so as to predict who in the control group would have been served an ad and/or would have responded thereto, had they been in the treatment group.

Specifically, an AI module of the system may be configured so as to make a prediction as to which of the people in the control would have seen an ad and responded positively thereto had the ad actually been served. More specifically, the machine learning engine of the AI module may be trained on the treatment group so as to generate a predictive model, and the results of that predictive model may then be applied by the inference engine on the control group so as to predict who in the control group would have become an impression and so being which would have led to a conversion. In this manner, a predictive analysis may be performed between these two groups, and rather than actually serving an ad to members of the control group and determining the results thereof real time, the results may be inferred via implementation of the AI module.

Accordingly, in implementing an AI module for performing an incremental lift analysis, one or more of the following steps may be performed. As indicated above, at a first step, bid opportunities come in from the exchange, and at a second step, the combinatorial engine may be employed so as to sort the bid opportunities and separate them into a treatment group and a control group. Typically, this separation into treatment and control groups may be effectuated by the combinatorial engine applying a hash function to the incoming bids, such as based on the consumer identification designation (User IDs) associated with the incoming bid opportunities. Specifically, as can be seen with respect to FIG. 4A, those bid opportunities ("bids") that are directed to the treatment group may be designated as $BR_T$, and those bids directed to the control group may be designated as $BR_C$.

Once consumers representing bid opportunities have been separated into a treatment group, e.g., bid requests in treatment ($BR_T$), and a control group, e.g., bid requests in control ($BR_C$), the whole or a subset of those in the treatment group can be served an advertisement opportunity for the advertisement being tested, and as indicated, if the bid is won on the open exchange, an advertisement may actually be served to the consumer thereby making it an impression. Hence, in various embodiments, only a subset of the consumers representing bids in the treatment group actually see the ad, e.g., based on various variables such as those indicated above. The present system, therefore, is configured for tracking and counting the impressions of the treatment group, where ($I_T$) represents the impression count in treatment. Particularly, an impression represents a bid opportunity for an advertisement that is won and actually results in the test advertisement being presented to the consumer at the publisher's webpage, and/or is seen by the targeted consumer.

Likewise, the present system is configured for tracking and counting the actions taken by those in the treatment group after having been exposed to the advertisement, where ($I_T$) represents the impression count in treatment. Particularly, the response of the consumer in treatment to the advertisement is also known and can be tracked as ($A_T$), which represents the positive activity the consumer engages in, i.e., activity count, after having been exposed to the advertisement ($I_T$) as a member of the treatment group. Consequently, the impression count ($I_T$) and activity count ($A_T$) for the treatment group are known quantities that can be tracked and transmitted to the system for recording and use by the A/I module.

The system is also configured for recording control group bid opportunities for control group consumers who are not served an advertisement but likely would have been bid on and actually served an ad had they been in the treatment group. As indicated, it is not actually known which consumers in the control group would have actually seen an advertisement had the control bid actually been submitted on the open exchange and/or won, and if won, it is not known whether the control group consumer would have viewed or otherwise performed an action due to their having seen the control group advertisement. Accordingly, the impression count in control ($I'_C$) is not known. Likewise, the activity that a consumer in the control group would have taken had they been exposed to the advertisement ($A'_C$) is also not known. But both of these factors can be predicted, as explained below, by the A/I module for both the treatment group and the control group.

Hence, instead of actually serving an advertisement to the consumers in the control group, the A/I module is configured to predict or otherwise infer the number of consumers in the control group whose representative bid opportunities would have won and/or would have been exposed to the advertisement, and further predicting the number of consumers in control who having been exposed to the advertisement would have taken a positive action with respect thereto. The A/I module of the system, therefore, is configured for predicting the impressions in control, where ($I'_C$) represents the predicted impression count in control, and further predicting the activity count in control ($A'_C$).

Figure 4A:
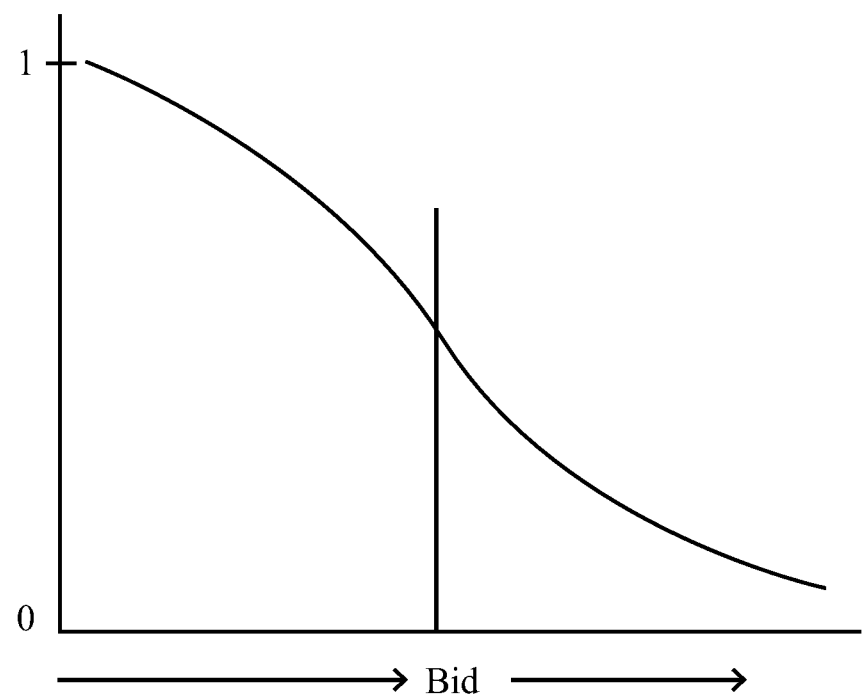
FIG. 4A presents a top-end filter to be applied when determining incremental lift.

Particularly, as can be seen with respect to FIG. 4A, an A/I module of the system may implement one or more ML paradigms, such as on the treatment group, so as to generate a predictive impression model that may be applied to the control group by an inference engine so as to produce predictive data that may then be used to determine incremental lift. Specifically, in performing a predictive analysis, a predictive impression model may first be generated according to one or more rules of the system, which model can then be applied to the treatment group, so as to predict who in the treatment group would see an advertisement, and having seen an advertisement, who would have acted in response thereto. The results of this predictive analysis can then be compared to the actual known results. More specifically, the results of the predictive model as applied to the treatment group, e.g., actions that are attributed to, or otherwise associated with predicted impressions, $A'_T$, can be compared to the actual results of those in the treatment group, $A_T$, who actually were served an ad and/or responded thereto so as to error correct the predictive model.

Where the predicted results do not match the actual results, an error correction can be performed, and a new predictive analysis run until the predicted results substantially match the actual results. In a manner such as this the ML module may be trained in a manner so as to generate an effective model that can be applied by the inference module to the control group data to make one or more predictions with respect thereto. Accordingly, applying a predictive model to the treatment bid requests $BR_T$ results in a predictive impression count for treatment that can be designated as $I'_T$, where $I'_T$ represents the predicted impression count in treatment. Likewise, the predictive model may be applied to the predicted impression count in treatment, $I'_T$, so as to determine the actions associated with predicted impressions, e.g., action count $A'_T$, which would be predicted to result from $I'_T$, such as where $A'_T$ represents actions associated with or otherwise in the predicted impressions.

Further, as indicated, once error corrected, the predictive impression model can then be applied to the control group, and the results of the predictive model determination can be used to infer who in the control group would have seen an advertisement, e.g., been an impression, $I'_C$, and further to infer which of those predicted impressions, $I'_C$, would have led to an action in the control $A'_C$. Hence, applying the predictive model to the bid request in control, $BR_C$, results in predictive impressions for control, $I_C$, from which the associated activity count, $A'_C$, can be inferred.

Next, the actual through rate for treatment is known and can be determined by dividing the actual activity count $A_T$ in treatment by the actual impression count in treatment $I_T$, which results in the actual known action through rate. Likewise, from the data generated by the predictive model, the predicted action through rate for both the treatment and control groups may also be derived, where the predicted action through rate for the treatment group may be derived from dividing the predicted impression associated activity count in treatment $A'_T$ by the predicted treatment impression count $I'_T$, and likewise the predicted action through rate for the control group may be derived from dividing the predicted control impression associated activity count $A'_C$ by the predicted control impression count $I'_C$. The difference between the resulting action through quotient for the treatment $(A'_T/I'_T)$ and the resulting action through quotient for control $(A'_C/I'_C)$ represents the predicted incremental lift, which incremental lift represents a determination as to which impressions led to a lift in consumer activity that is the consequence of the consumer interacting with the advertisement. Accordingly, a lift analysis can be performed across these two groups.

However, in certain instances, there are some instabilities that may result from applying one or more predictive models to the treatment and/or control data, such as with respect to the number of impressions that is predicted in control as compared to those in the treatment. For instance, in various instances, the A/I module may introduce one or more errors, because the impression counts can tend to fluctuate, which can cause wide variability in analysis results and lead to bias. This bias may result from, or be in addition to, the fact that the treatment group bids may fluctuate because they are actually submitted to the ad exchange system, where they may not win the external bid, while the control bids are not. The A/I module, therefore, can be configured for correcting for such biases.

For instance, in one implementation, as can be seen with respect to FIG. 4A, each of the predicted impression associated activity counts for the treatment $A'_T$ and control $A'_C$ may be multiplied by an error factor, e, which represents the quotient that results from dividing the actual activity count, $A_T$, by the predicted activity count, $A'_T$, such where $e = A_T/A'_T$. Particularly, in a particular implementation, the predicted activity counts in each of the predicted through rates for the treatment and control groups may be corrected by multiplying both $A'_T$ and $A'_C$ by e. In such an instance, the action through rate for the treatment group becomes $A'_T \times A_T/A'_T$, which for the treatment group results in a numerator for the predicted through rate for treatment that is $A_T$. However, the action through rate for the control group becomes $A'_C \times A_T/A'_T$.

Additionally, in a further implementation, the denominator for each of the predicted through rates for the treatment and control may also be corrected for, such as by subjecting the predicted winning bids, e.g., predicted impressions, $I'_T$ and $I'_C$, respectively, to a top-end filter. For instance, as can be seen with respect to FIG. 4B, a top-end matrix or graph may be generated whereby all of the bids in treatment, and separately all of the bids in control, can be subjected to a predictive analysis so as to rank each of the bid requests with respect to their probability of winning the auction and/or leading to an action by the consumer, such as leading to an impression and/or conversion. Particularly, the incoming bid opportunities can be run through a filter applied by the AI module whereby the bid opportunities, $BR_T$ and $BR_C$, may be multiplied by the actual determined win-rate, the result of which represents the value of "n", where based on the value "n," the probability for each bid to win at auction and/or lead to an impression or conversion, the bid opportunities can be ranked in their order of greatest probability.

Specifically, the AI module may be employed so as to make a prediction as to whether a bid will lead to an actual impression, generally $(I_T/BR_T)$, e.g., win-rate, which prediction may be expressed as a probability having a value from 0 to 1. This probability may be represented graphically on the Y-axis. Likewise, once the AI module may is trained so as to determine the probability that any given bid will be an impression, then the various bids may be ranked by order of highest probability from left to right on the X-axis.

Figure 4B:
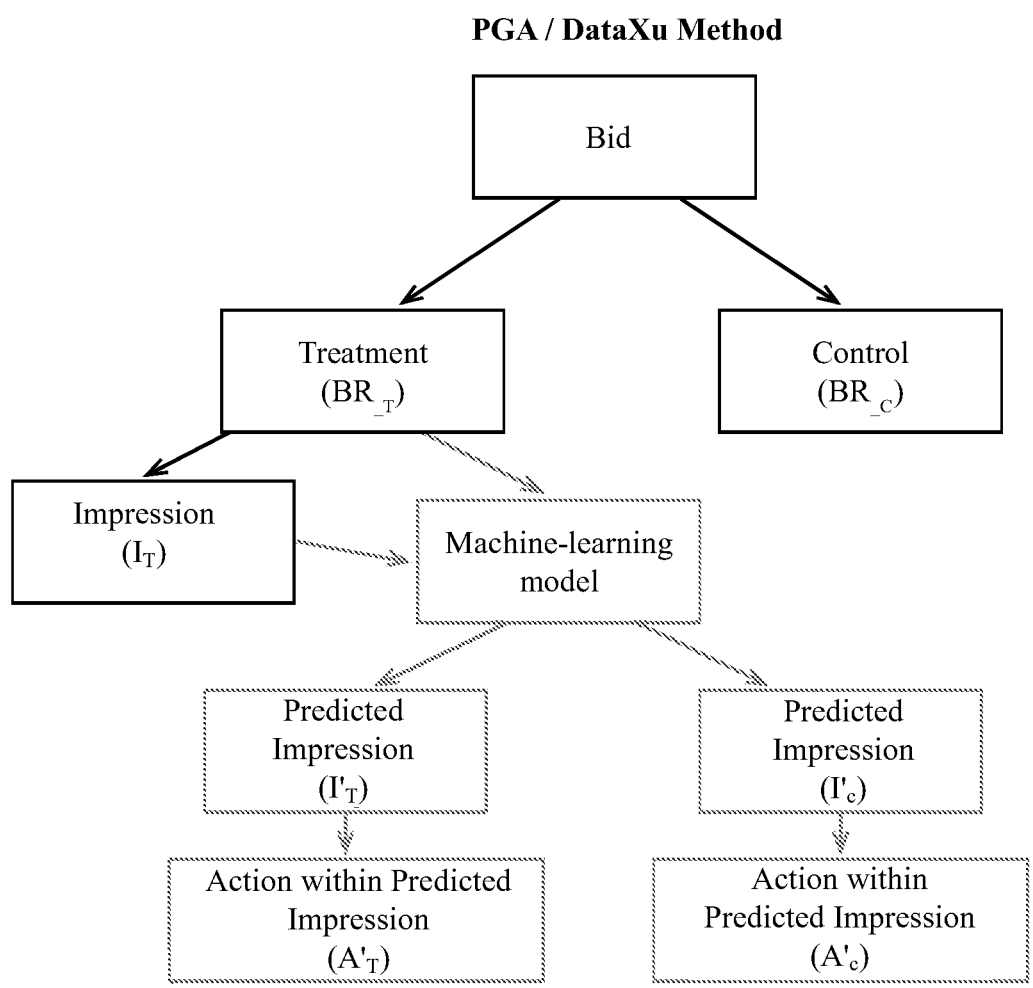
FIG. 4B illustrates an exemplary flow chart for performing a predictive analysis in the determination of incremental lift.

Accordingly, as shown in FIG. 4B, the results of this top-end analysis can be characterized graphically where the Y-axis represents the probability that any given bid opportunity when associated with an advertisement will eventually convert into an advertisement impression and/or a product sale. So being, this probability can be represented on the Y-axis from 0 to 1. The X-axis, on the other hand, represents those bid opportunities that have been run through the ML module so as to determine their win-rate, $I_T/BR_T$, e.g., the actual impressions over bids in treatment, and are now ranked in order, with bids having the greatest probability being positioned toward the Y-axis. Hence, as can be seen with respect to FIG. 4B, probability is distributed on the Y-axis, and the X-axis represents the distribution of the bids sorted by their ranked order with those having the highest probability being positioned closest to the Y-axis.

The demarcation line, therefore, represents the top end bids having the highest "n" probability, where n represents $BR_T$ and $BR_C$ multiplied by the determined win-rate, e.g., $I_T/BR_T$. This allows the system to select a certain value of impressions "n", which most closely represents the number of impressions that would have been present in control. However, it is noted that $BR_T$ multiplied by win-rate gives us "n" for the treatment group, while $BR_C$ multiplied by win-rate gives "n" for control. And these n's might be different values depending on the proportions of treatment and control. Thus, by using "n", e.g., $n_T$ or $n_C$, the system can select for the most likely impressions, such as by selecting the most top end impressions, e.g., those impressions positioned leftwards towards the Y-axis away from the demarcation line. Once the treatment and control bids have been ranked, the top end bids that are predicted to be impressions may be selected as the most likely bids in treatment and control that would have been impressions, had they been in treatment. In this manner, at the selected cutoff point, only those bid opportunities having a probability greater than the cutoff point are considered for incrementality testing.

Hence, using a predictive model determined by the machine learning engine, the top end treatment and/or control bid opportunities that represent the bids that would most likely have been impressions and/or conversions may be taken as data points to be considered by the ML platform in developing predictive models, and may further be employed by the inference platform in running the top end results through the predictive model so as to determine the incremental lift. Consequently, the action through rate for treatment becomes: $A_T/BR_T \times$win-rate, and the action through rate for the control becomes: $A'_C \times A_T/A'_T$ divided by $BR_C$ x win-rate. Accordingly, this formulation results in a more precise determination of incremental lift and a more accurate measurement of the affects that an advertisement associated with a winning bid had on the decisions of consumers to either view an advertisement and/or purchase the advertised product.

Figure 5:
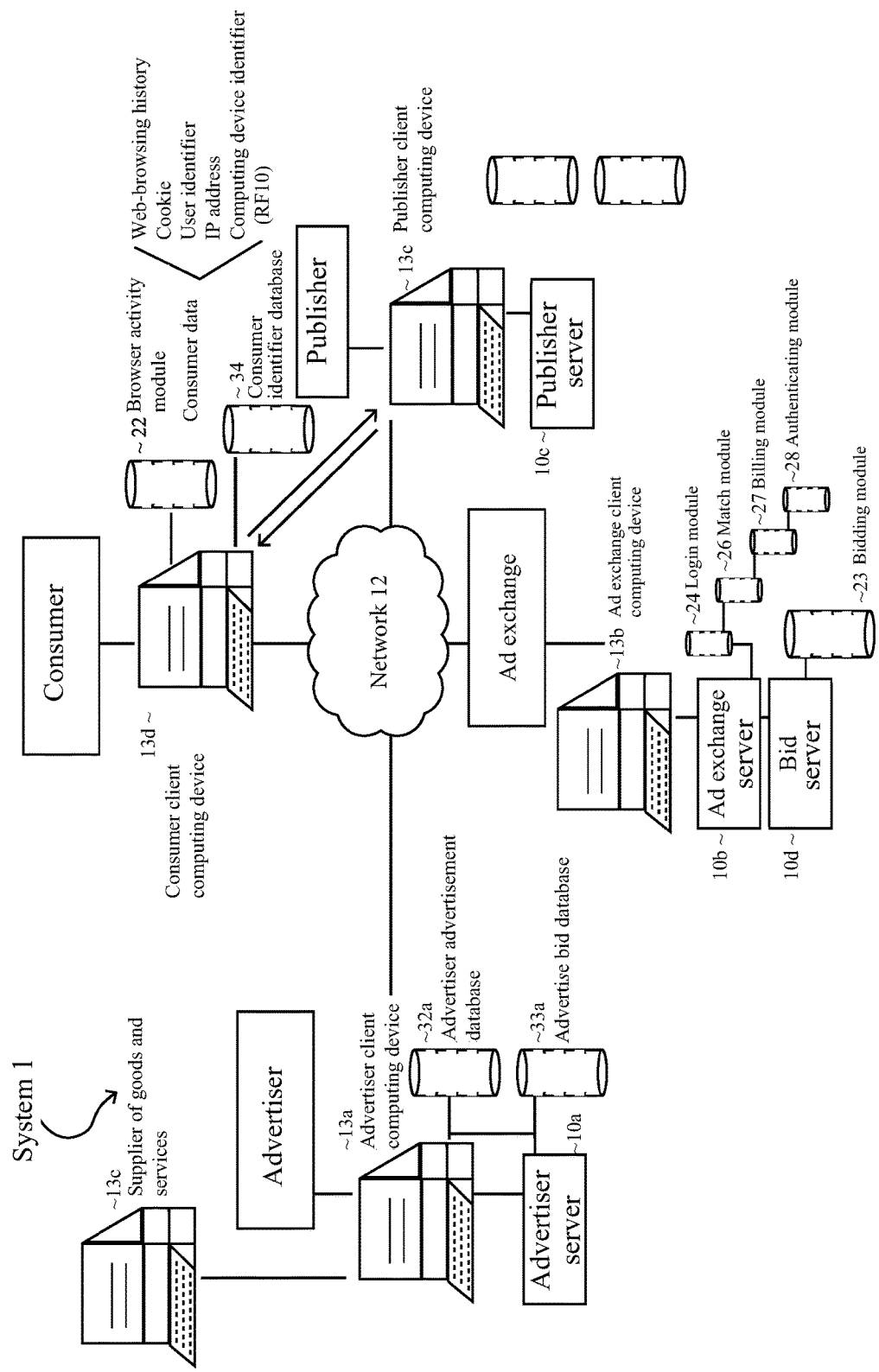
FIG. 5 presents a schematic diagram of a system for conducting on online bidding process.

As indicated above, the incremental lift determining process may be performed, at least in part, by an AI module, which AI module may be associated with or otherwise implemented by a system server, such as an advertisement, advertisement exchange, and/or a publisher system server. Accordingly, in one aspect, as can be seen with respect to FIG. 5, presented herein is a system 1 for measuring the effectiveness, e.g., incremental lift, of a digital advertising campaign. The system 1 may form a real-time digital advertisement buying platform that includes a collection of servers 10 that communicate one with the other over a network 12 so as to effectuate a real time bidding process, such as described above.

For instance, the servers 10 may include an advertisement server 10a, an advertisement exchange server 10b, and a publisher server 10c. Together these servers are configured for implementing the various processes and performing the various methods disclosed herein. Particularly, the advertisement server 10a may be configured for receiving a bid request, performing an internal bidding operation to derive a winning bid price to be paid, associating an advertisement with the winning bid in response to the bid request, and submitting the bid to the advertisement exchange server 10b for participation in the external bidding process. The advertisement exchange server 10b is configured for receiving fulfillment requests for available inventory from the servers of various publisher systems, and then eliciting bids from various advertiser systems so as to fulfill those requests. Hence, the advertisement exchange server 10b is configured for conducting an open market bidding process by receiving advertisements and bids, selecting the winning bid, and forwarding the advertisement associated with the winning bid to the publisher server 10c for publishing thereby. Likewise, the publisher server 10c is configured for receiving the winning bid and in response thereto publishing the advertisement.

Generally, a server 10 of the digital ad buying platform 1, may be in communication, such as over the network 12, to one or more computing systems 13, which server 10 and/or computing system 13 may be coupled to one more databases 30, such as a shared or dedicated database, and may further be communicably coupled to a plurality of data sources 14. For instance, one or more of the advertiser server 10a, the advertisement exchange server 10b, and the publisher server 10c may each be accessed or may otherwise be coupled to an individual client computing device, 13a, 13b, 13c, respectively.

A client computing device 13 of the digital ad buying platform 1 may include a CPU for performing, or otherwise running, logical operations, such as embodied in hardware, e.g., firmware, or software, which function to implement one or more instructions, such as instructions directed to performing one or more steps in the advertisement buying process. In various instances, the software instructions may be written in a program language, such as JAVA, C, or C++, or the like. For instance, various software can be run on a series of processing engines so as to form one or more digital ad buying modules, such as modules that can be compiled, linked, and/or otherwise communicably coupled so as to perform a series of executable programs, in software or firmware, to thereby effectuate the ad bidding process. For example, executable programs run in software may be installed and/or written via a dynamic link library, or an interpreted language, such as BASIC, PERL, LAU, PHP or Python and the like. Hardware effectuated modules execute logic units via gates and flip-flops, which can be implemented in programmable units, such as programmable gate arrays or processors. Particularly, a processing module may be formed by one or more integrated circuits, such as implemented in a field programmable gate array (FPGA) or (ASIC).

Each computing system 13 may include a client computing device 15 having an operating system that runs one or more of the various ad supplying and buying processes herein disclosed. For example, a server 10 and/or client computing device 13 of the system 1 may include an incremental lift determination module, implemented in hardware or software, which is adapted for executing the functions and acts useful for performing one or more of the following call outs or functions: Receiving and evaluating a bidding opportunity, considering an advertisement of a good or service being offered for sale in response to the bidding opportunity, evaluating a bid to be made with respect to publishing of the advertisement, determining a bid price, communicating the determined bid and advertisement, to an ad exchange server, and/or for determining the extent to which there is a causal connection between a potential consumer's viewing of the advertisement and their purchase of the advertised product or service.

Particularly, a server 10 and/or computing device 13 may be configured for determining the incremental lift an advertisement has on a consumer's decision to make a purchase of the advertised product or service. Accordingly, the incremental lift determination module may have one or more processing engines that are configured for running one or more processes for determining incrementality, as described above. In one implementation, a computing system 13 of the digital ad buying platform 1 may generate a graphical user interface for presentation at a display of the client computing device 13 whereby one or more of the disclosed processes may be initiated, such as by a user input. Particularly, the one or more client computing devices 13 may be configured for connecting a user to one or more other system components, such as the advertisement server 10a, ad exchange server 10b, a publisher server 10c, a bidding server 10d, and the like, such as over an internet network connection 12.

Consequently, a client computing device 13 may serve as a user access point, such as for an advertiser 13a, ad exchange operator 13b, a publisher or inventory supplier 13c, a consumer 13d, a seller or producer of goods or services 13e, or other third party. Particularly, the graphic user interface of a computing device 13 of the system 1 may give a user access to the system, such as for engaging with one or more of the system components and/or for directing one or more functions thereof, such as for eliciting a bid request, creating and transmitting a bid request, supplying an advertisement in response to a bid request, and/or taking an action with respect thereto, including setting up a marketing campaign, generating a bidding initiative, performing a bidding operation, determining publishing requirements, and for viewing the bid request, or advertisement, e.g., once the bid is won and the advertisement is published.

For instance, in one embodiment, the system 1 may be configured to provide an advertiser access point 13a such as for allowing an advertiser to select a bid amount and an advertisement to be submitted to an ad exchange in response to a bid request and for providing characteristics thereof. The system may also be configured to provide a publisher, e.g., a content supplier, access point 13b whereby a supplier of inventory, e.g., a publisher, can access the system 1, and send out an elicitation for bids to be submitted for the fulfillment of available inventory. In certain embodiments, a provider of goods or services may also have an access point 13e. In various instances, the advertiser 13a and the provider 13e access points may be different, such as where the two represent separate entities, however, in certain instances, the advertiser and provider of goods or services are the same.

One or more of the advertiser 13a, supplier 13c, and/or provider 13e access points may include or otherwise be coupled to an advertisement database 32a providing the actual ad creative, e.g., a media rich advertisement, which can be submitted to the advertisement exchange server 10b for participation in an external bidding operation, along with characteristic data pertaining to the advertisement and bid submission data. A consumer access point 13d may also be provided, such as where a user, e.g., a consumer, of the system, can engage with a web server of the system 1 over the internet network connection 12 through interacting with the user interface presented at the display of a consumer client computing device 13d.

Specifically, in one use model, a consumer can engage a publishers website, or other networked resource of the system, so as to perform an online inquiry, such as an internet search, which online activity may automatically activate a bidding initiative, at the publisher's website, which bidding initiative can then be transmitted to the ad exchange server 10b, whereby the ad exchange server system 10b can initiate an auction by informing a plurality of ad servers 10a that it is accepting bids for advertisements to be served to the publisher's website for posting thereby in response to the consumer's engagement with the publisher's website. In this manner, a plurality of advertiser servers 10a can provide advertisements and bids to the advertisement exchange server 10b for the opportunity to serve an advertisement to the publisher server 10c so as to be displayed on the publisher's webpage that the consumer is visiting. Hence, an access point of the system 1, such as presented at a display of the client computing device 15 may be configured to allow a user of the system, e.g., an advertiser, supplier, and/or consumer, to engage with a webserver 20, over an internet network connection 12, and to thereby allow the user to configure or otherwise interact with the system. Particularly, a user, e.g., a consumer, can interact with a graphical user interface at a client computing device of the system 1 so as to engage with a webpage by interacting with a webserver of the system, which webserver functions to serve files from for various webpages at the request of the user. In this manner, the user can employ the graphical user interface presented at the display of the client computing device 13d, so as to configure the system, browse the world-wide-web, and view one or more advertisements.

In particular instances, the system 1 may include one or more, e.g., a plurality of online activity modules so that the consumer's online activity can be monitored, tracked, stored, and/or otherwise analyzed by one or more of the system components. For example, the system may include a browser activity module 22, for monitoring and recording user, e.g., consumer, online search activity, including webpages visited, time spent on webpages, bounce rate, searches made, keywords, advertisements clicked on, purchases made, cookie data, and other online use data for the consumer. This data may be used by the system, such as by the advertiser server 10a for determining whether to make a bid to serve this particular consumer an advertisement. Particularly, a system server 10a and/or 10b may include or otherwise be associated with a bidding module 23 or sever 10d that is configured for assessing one or more bid requests and/or consumer characteristics and deciding whether to make a bid, and if so, for attributing a monetary value to the bid.

In this instance, the bidding module 23, may be an internal bidding module configured for considering a variety of factors, such as with regard to consumer characteristics, publisher characteristics, and/or advertisement characteristics in determining whether to make a bid, and if so what value to place it at. Hence, in various instances, the internal bidding module 23 may function for submitting a bid to the advertisement exchange server 10b for consideration thereby. In such instances, the bids to be submitted may have any form, but will particularly include the name and address of the advertiser/provider, their characteristics, characteristics of the advertisement, including the size of the advertisement, characteristics of the bid, including the bid price, as well as online data, such as the time stamp, history information, including information retrieved from a consumer's online behavior, and the like. Likewise, as described above, the advertisement server system 10a may also include an A/I module 25, as described above, for performing one or more predictive processes including the incremental lift determination described in detail herein. Other modules may also be included, such as a login module 24, to track system usage, as well as a match module 26 for matching bid request with appropriate advertisements, a billing module 27, such as for charging advertisers for provided services, and an authentication module 28 functions to verify information input and/or otherwise associated with the advertisers, publishers, and consumers, e.g., retrieved information.

As indicated herein, one or more of the access points 13 may be coupled, through the network connection 12 to one or more databases 32, such as an advertisement database 32a that includes a collection of advertisements for publication, which database may also store, or be coupled to a database 33a that stores data pertaining to a consumer and/or bid data, such as a bid to be associated and submitted with the advertisement. Particularly, the advertisement database 32a may include advertisements submitted by the advertisers or goods provider for display at the consumer's browser presented at a graphical user interface of a client computing device. The database 32a may also include a collection of advertisements or advertisement elements, such as one or more media assets for integration into an advertisement collection, which advertisements can be categorized and available for selection for inclusion with a particular bid to be proffered. Their electronic addresses for retrieval and deployment may also be included.

An advertiser consumer and/or bid database 33a may also be included, such as where the database contains consumer and/or bid data, such as data related to previous consumers, previously submitted, current, and/or bids to be presented, for instance, both with regard to accepted and rejected bid opportunities. For instance, the bid database 33a may include data related to one or more characteristics of the bid opportunities and bids made, such as amounts, advertisements associated with the bids made, and the consumer and/or other audience associated with the bid opportunities. Particularly, the database may store consumer and/or bid identifiers, information about the consumer and/or product and/or advertisement submitted with the bid, in response to the bid opportunity, product and/or bid prices, advertisement and/or bid and/or consumer identification information, and the like. For example, the bid database can further include data related to a target consumer's web-browser, such as a device identifier, e.g., RFID, IP address, as well as search browser and cookie data.

In particular embodiments, a separate consumer identifier database 34 may be included for storing consumer data, such as data related to the various consumers related to served bid opportunities. Such consumer data may include any type or form of data related to a consumer engaging in internet activity, such as with respect to webpages, web sites, web sessions and/or web applications they visit and/or otherwise engage with. For instance, consumer information include geolocation or geographical information, system data, marketing information, and/or third-party segment information. Geo information may include information related to the user network, internet protocol (IP) address, access point, e.g., Wi-Fi hotspots, geographical location and mobile tracking, as well as demographic and other geographical information system data linked to the user location. System data can include any consumer information stored or tracked by the publisher or network, such as user preferences, browsing and transaction history, and user device information. Some of this information can be tracked by cookies and/or Adware, and may be searched and collected by a suitably configured web-crawler.

Particularly, the consumer identifier database 34 may collect and store data that may be employed to identify the consumer, identify the device the consumer is using to browse the internet, record the consumer's browsing history, characteristics about the consumers browsing behavior, including products viewed, websites visited, purchases made or not made, and the like. More particularly, the consumer's online search histories, e.g., cookies, may be tracked, recorded, and stored, such as for use by one or more system components, for instance, by the advertisement server, in deciding whether to submit a bid to win the opportunity to serve an ad to any given consumer, e.g., based on their historic online activity. In various instances, the online, e.g., cookie, data can identify a particular browsing session and the consumer's selections and website history over a period of time. In various instances, the consumer identifier database can reference other consumer identifier and/or user cookie information.

For instance, a user identifier or cookie for a user can be linked with a user identifier for one user device, and also linked to another user device, such as by being linked to a common identifier, such as by an email address, or other consumer identifier of a user. Hence, in various instances, a consumer identifier database 34 may be provided where the database stores data pertaining to the consumer, and/or the client computing device they are employing, so as to access the network resources. For example, the user data may include a user name, email address, identification number, and other personal information. Additional consumer information may include third-party collected information such as information identifying one or a group of specific consumers as well as their online shopping habits. Such data may include insights into the online shopping profiles of consumers, data related to an impression or conversion, patterns of consumer behavior and/or advertising characteristics leading to that behavior, and behavioral targeting data. In particular instances, the consumer data may include information related to tracking a consumer after they have left a publisher's website, especially with respect to the user subsequently visiting the advertiser's website to complete an action or transaction with regard to an advertisement they viewed on the publisher's website. Accordingly, such consumer collected data can identify consumer attributes and/or actions indicating past or potential success in further marketing efforts.

In a particular embodiment, a browser activity database 36 may also be provided, such as for storing the browsing activity of various consumers. For example, the online activity database 36 can collect and store consumer action on a browser instance. In such an instance, cookie data can be used to determine the various websites the consumer visits, and can include information on a purchased products that can be used to determine the types of bids to submit for various consumers. Additionally, an incremental lift and/or causal impact database 38 may also be included, such as to collect and store data pertaining to the consumer's viewing of an advertisement and/or the relation of that viewing to their decision to actually buy the product or not, especially with respect to a proffered bid, impression, and/or conversion. In various embodiments, the causal impact data to be determined and/or stored, such as for use in the various analyses carried out by the system, may include the high and low, mean and average, standard deviation, and other statistically relevant data pertaining to the causal effect, the treatment effect, incrementality, individual causal effect, and the like may all be collected, calculated, and stored in the causal impact database.

One or more of the databases disclosed herein, such as an advertiser database 32a may include data related to impression and/or conversion opportunities, including data related to the network, publisher, channel, ad size, impression and conversion counts, conversion rates, and action through rates. Publisher data can also be collected and stored, such as data related to the content and web traffic of a publisher or website offering an bidding opportunity. Such data can include an identifier of the publisher and/or website, information about impression opportunities, and the like. Channel data related to the type and reach of a media channel associated with a bidding opportunity may also be collected as well as mobile device content and RSS feeds.

In various instances, a database of the system may be a relational database. Hence, as described herein below, a provider, advertiser, advertisement, advertisement exchange, consumer, bidding, and/or other supplier, e.g., publisher, information can be parsed and categorized based on one or more characteristics, such as whether the bids sent were from a control or test group, whether the bid was won or lost, whether the advertisement was published, whether the consumer makes a purchase, and the like. The system 1 may also include an advertisement exchange system 50 that functions to implement a real time bidding process by which advertisers who have a database 30 of advertisements to place may make a bid for consideration by a publisher who has advertisement space to be filled. Specifically, the advertisement exchange system 50 facilitates the transaction between producers of media rich display advertisements, e.g., advertisers, who want to fill available space with their advertisements, and publishers who have available space to fill.

In various embodiments, the advertisement exchange system 50 may be configured as a demand side platform (DSP) that is adapted for providing an interchange whereby a plurality of ad exchange servers 10b can interact with a plurality of advertisers 10a and publishers 10c, such as advertisers 10a having advertisements to place and which may then make bids to be considered by multiple publishers 10c that have websites with available inventory needing to be filled. For instance, the system 1 may be configured to provide a demand side platform that integrates multiple pools of advertisement opportunities, such as provided by publishers 10c, and further integrates multiple pools of advertisers 10a having advertisements to be placed, whereby the various advertisers can bid for the available advertisement opportunities provided by the various publishers. In particular embodiments, the ad exchange system 50 provides a demand side platform that accommodates multiple advertiser and publisher access points whereby a plurality of impression opportunities are provided to a variety of different advertisers from number different content providers, e.g., publishers.

These impression opportunities can be pooled together such that a pool of impression opportunities may include multiple impression opportunities from a single publisher, a group of publishers, an ad exchange, and/or an ad network. Hence, in this manner the ad exchange server 50 can control, distribute, offer, administer or otherwise manage one or more pools of impression opportunities, an thus, the implemented DSP can function as an interface between a plurality of impression or bidding opportunity providers, e.g., sellers, and a collection of potentially interested advertisers, e.g., buyers. Accordingly, in various instances, the DSP can be configured to include multiple ad exchanges upon which the bidding can take place, whereby a user of the system 1 can access the DSP and the multiple ad exchange systems 10b via a single interface.

In certain embodiments, one or more of the advertisement platform and the ad exchange platform can be built and/or be configured for supporting or providing impression opportunity and/or transaction analyses. Particularly, one or more of the platforms disclosed herein may implement the disclosed AI module to better effectuate supply/buy side services in a manner that enhances impression opportunities, such as with regard to automating impression opportunity workflow. For example, one or more AI protocols may be implemented so as to design ad campaigns and apply these to multiple ad exchanges, to interface with the multiple ad exchanges, to create and evaluate pools of impression opportunities for analysis, execution, and bidding, and for generating insight and analytics, such as quantitative analysis in evaluating bid opportunities, determining outgoing bids, and reviewing performance analytics, including impressions and conversions.

Accordingly, the system 1 may be configured to process and/or analyze data associated with various bidding opportunities, impressions, and/or conversions and to normalize these into metrics for comparison against goals set by its various different advertising campaigns. Such analyses may statistically and/or intelligently process or analyze all forms of collected data so as to help an advertiser customize, analyze, and evaluate bid opportunities, as well as to determine bid pricing, such as in the development of an advertising campaign that is based on the advertiser's goals. Consequently, the system can dynamically update various campaign matrices to help an advertiser adjust or implement advertising campaigns based on their goals. For example, the system can determine, e.g., via an impression and/or conversion calculator and/or a bidding module, an estimate of daily impression/conversion opportunities across a plurality of impression/conversion opportunity providers so as to identify an appropriate advertising campaign strategy. Such analyses may include and make use of any type or form of data processing, such as any statistical, algorithmic, or other intelligent computation, profiling, and/or prediction that may be performed with respect to evaluating bidding opportunity information, including impression and conversion data related thereto, which evaluations can then be used in formulating an ad plan, ad campaign, and/or a bidding strategy that may be implemented for the performance of a transaction across one or more ad exchanges. A transaction can be any type or form of operation associated with bidding, trading, and/or evaluating and/or procuring impression opportunities.

As indicated above, the system may include a plurality of publisher system servers, where each server runs a publishing platform for publishing content, such as where the published content provides opportunities for the publishing of advertising. Accordingly, the system 1 is configured for implementing an intelligent and dynamic buy-sell demand side platform whereby one or more publisher servers 10c transmit impression opportunities for presentation to one or more advertisement agency servers 10a for bidding thereon via one or more ad exchange servers 10b.

Each ad agency can represent a plurality of clients interested in impression opportunities, where each client has a plurality of advertisements with which to proffer a bid. Ad agencies design and implement advertisement campaigns on behalf of their clients. Consequently, ad agencies access the platform and/or exchange servers 10b via an advertiser client computing device 13a so as to attempt to purchase impression opportunities from publishers based on the advertising campaign they have developed for their client. However, in various embodiments, the provider of goods and/or services can access the system 1 via the a provider access 13d, and thereby attempt to purchase impressions on their own, instead of using an advertisement agency as an intermediary.

The intelligent and dynamic demand side platform, therefore, can interact with advertisement agencies 10a, as well as sellers of goods 10d, so as to determine, in connection with the ad agencies and/or their clients, which impression opportunities to bid on, and how to bid, such as based on information collected from the publisher 10c and the advertiser 10a, and further data collected on the consumer 10d, especially with respect to their historic online activities. And likewise the advertisement exchange 10b can interface with an advertiser 10a and/or publisher 10c via the DSP such as to process information provided by the ad exchange.

In view of the above, in one aspect, provided herein is a real-time digital advertising selling, bidding, and buying platform that can be employed so as to determine the incremental lift of an advertising campaign, while avoiding the cost and biases inherent to actually serving an advertisement or public service announcement to a control group. In various embodiments, these goals may be accomplished, in part, by generating and implementing an intelligent randomization and/or a correction model that corrects for both the market effect as well as auction win bias, and thus, avoids the need to serve ads to and/or identify winner bias types in the control group.

As explained above, the present real-time, dynamic ad buying and selling platform includes an advertisement system server 10a that is configured for communicating and interacting with an advertisement exchange system 50 being implemented by an ad exchange server 10b, such as for participation in a real time auction, whereby the advertisement system server can evaluate whether to compete for the opportunity to submit a bid for available inventory within which to place an advertisement and thereby present an advertisement to a consumer at real time. This interaction may be directly with the advertisement exchange server 110b, or indirectly through a suitably configured demand side platform.

Specifically, in various embodiments, the present advertisement system 1 may be configured for evaluating and tracking individual instances of exposing a potential consumer to an advertisement, and/or the impressions and/or conversions that exposure results in, such as with respect to a decision the consumer makes with regard to purchasing the product or service advertised. Particularly, the advertisement server can be configured for quantifying and/or determining the nature of a causal relationship between the exposure of a consumer to an advertisement and their decision to make a purchase based on that exposure.

For instance, as disclosed herein, a causal measurement may be made so as to determine the incremental lift that is caused by the consumer being exposed to the advertisement, whereby the measurement accounts for: the difference between a response rate for consumers, e.g., in a treatment group that were exposed to the ad and make a decision to purchase the advertised product or service, and a predicted response rate for that consumer making that same decision to purchase had they not been exposed to the advertisement. Likewise, the measurement can further be configured to account for the difference between a response rate for consumers, e.g., in a control group, which were not exposed to the ad, and either decided not to purchase the product or service, or despite not having been exposed to the advertisement nevertheless made the decision to make a purchase. This causal measurement, therefore, can measure the degree to which a given decision made by a consumer to buy a product or service was influenced by being exposed to an advertisement. In essence, the measurement determines the extent to which exposure to a given advertisement has on influencing a consumer's behavior in making a purchase, while at the same time attempting to discount for those consumers who would have purchased the product or service regardless of having been exposed to the advertisement.

Particularly, in one specific implementation, the advertisement system may be configured for separating potential consumers into different groupings. A first set of groups may include a first and second group that represent populations of consumers to be exposed to an advertisement, and either decide to make a purchase of a product or service (group 1) represented in the ad or do not (group 2). A second set of groups may include a third and fourth group that represent populations of consumers that are not to be exposed to the advertisement, and yet either decide to make a purchase (group 3) or do not (group 4). In these instances, the response rates in each group can be compared one with each of the others, and the incremental lift due to being exposed to the advertisement may be calculated. In various instances, it may be useful for evaluating the same consumer population within each set of groupings. In this instance, either the exposed (test) set or the non-exposed (control) set will include an actual population of consumers, while the alternate set will be composed of a hypothetical population of consumers, identical to those in the other set, but for either having been or not been exposed to the advertisement.

In this manner the effectiveness of an advertisement can be measured with respect to its ability to effectuate a change in the behavior of a potential consumer exposed to the advertisement. In particular embodiments, potential consumers need only be divided into two groups, e.g., those in treatment and those in control.

Consequently, in performing the aforementioned incremental lift analysis, an advertisement system server 10a is provided and configured for evaluating the potential lift effect an advertisement has in eliciting a decision of a consumer to make a purchase. So being the advertisement system sever 10b includes a network internet connection 12 to communicate with a remote advertisement exchange system 50 being implemented by an advertisement system server 10b. The advertisement system server 10a is coupled to an advertisement database 32a for storing online advertisement campaigns, each having an online advertisement. Further, the advertisement system server 10b includes a bid processing engine for receiving and evaluating a request for one or more bids, e.g., received from the advertisement exchange server system 50, where each bid is associated with a consumer and represents the opportunity to submit an advertisement for publishing at a web-based interface of an online publisher and for thereby potentially being viewed by the consumer. Furthermore the advertisement system server 10b includes a bid matching engine 26a for searching the advertisement database, identifying an advertisement campaign that matches one or more particulars of a bid opportunity, selecting an advertisement from an advertisement campaign for association with a bid opportunity. The advertisement system server 10b also includes a randomization engine 29 that is configured for randomly separating received bid opportunities into either a treatment group ($BR_T$) and a control group ($BR_C$), such as where the randomization engine employs a hash function by which to allocate bids into treatment and control groups.

Where the selected advertisement is part of an incremental test campaign then a processing engine of the advertisement server will determine if the bid opportunity is allocated to a treatment or a control group, and if the bid opportunity is allocated to the treatment group, then the system server will determine a bid price, associate the bid price with the advertisement, and submit the same as a packet to the advertisement exchange server 10b for participation in an external bidding process. However, where the selected advertisement is allocated to the control group, the bid opportunity can be recorded and/or stored in an associated advertiser bid database, such as for further processing.

For the bid opportunities allocated to the treatment group, the advertisement system server may include a submission engine that is configured for submitting the advertisement and associated bid package from the treatment group to the advertisement exchange system server to produce a submitted bid for consideration by the advertisement exchange system server. This consideration by the advertisement exchange may include comparing this submitted bid by the advertisement system with other bids submitted by other advertiser systems, such as where the comparing may include performing an auction by which one bid out of all of the submitted bids is selected as the bid winner, and then the advertisement that is associated with the winning bid is transmitted to the publisher for publishing thereby. Likewise, once the winning advertisement is received and published by the publisher, the consumer associated with the bid may or may not perform one or more actions with respect thereto, such as by "clicking" on the advertisement, by visiting the webpage of the entity that is the subject of the advertisement, or taking some other action to indicate a provoked interest or disinterest, all of which may be considered activity data ($A_T$), which activity data may be collected and transmitted over the network back to the advertisement exchange server and/or to the advertisement system server.

In some embodiments, the advertisement system server 10a may further include an evaluation engine, such as employed by an associated A/I module, for receiving impression, conversion, and/or activity results data from the ad exchange system server 10b, such as where the activity results data includes one or more data as to whether the submitted bid was won (actual impression count $I_T$) or lost, and if won whether the submitted advertisement was viewed by the consumer (actual activity count $A_T$). Furthermore, this evaluation engine may be configured for predicting whether the submitted bid, e.g., treatment bid, would be won (upon submission to the ad exchange system) (predicted impression count $I'_T$), and if won whether the advertisement would be viewed or otherwise acted upon by the consumer (predicted activity count $A'_T$) to produce a predicted view and/or activity result.

The evaluation engine may further be configured for comparing the predicted activity result ($A'_T$—predicted activity count) to an actual activity result (actual activity count $A_T$) of whether the consumer actually viewed the advertisement, the evaluation resulting in determining a win-rate result. Additionally, the advertisement server system may also include a prediction engine configured for predicting whether the advertisement associated with a bid opportunity in the control group would have been viewed had the advertisement and bid been submitted to an external bidding process and won to produce an inferred-impression count result ($I'_C$), and if won whether a consumer having been exposed to the advertisement would have seen the advertisement and/or performed on or more actions with respect thereto (predicted activity count $A'_C$).

Hence, the evaluation engine is configured for evaluating an advertisement associated with a bid opportunity in the treatment and/or control group, predicting whether the advertisement in the treatment and control group would have won if submitted to an external bidding process, and if won whether the advertisement would have been viewed and/or acted upon by a consumer had the advertisement been published on a webpage being viewed by the consumer. This data may then be employed to produce an inferred-win-rate.

Specifically, the advertisement server system may additionally include a prediction engine configured for using the collected data to generate and apply a predictive top end model to the incoming bid requests in treatment and control so as to predict which bid requests would have been likely to lead to impressions and/or conversions, and thus ranking each bid opportunity by its inferred probability. Consequently, the evaluation engine is configured for applying the win-rate result to the incoming bid requests ($BR_T$) and ($BR_C$), ordering the bid requests by their likely success rate, and then selecting only those bid opportunities having a determined likelihood of winning to the aforementioned incremental lift analysis.

Accordingly, the advertisement system server 10a may implement an AI module for evaluating an advertisement that is part of an advertisement campaign to be tested, whereby the internal winning bids in one or both of the treatment and control groups are evaluated by the AI module so as to enhance the effectiveness of the incremental lift determination process and thereby generate superior evaluative results. Particularly, the AI module may be configured to generate a predictive model for performing a bid evaluation analysis for weighing bid opportunities. In various embodiments, this lift analysis result may be employed by the system so as to determine the effectiveness of an advertising campaign and/or be used to determine and/or adjust future bids to be made in response to presented bid opportunities and/or for selecting which advertisements out of a collection of advertisements to be submitted in response to the bidding opportunity, e.g., in response to previously won or lost bid opportunities.

With respect to the artificial intelligence module: in one aspect, a cloud accessible artificial intelligence module is provided, and is configured for being communicably and operably coupled to one or more of the other components of the processing pipeline disclosed herein. For instance, the AI module may work closely with a suitably configured workflow management system (WMS) so as to efficiently direct and/or control the various processes of the system disclosed herein. Accordingly, provided herein, is an AI module that is configured for determining one or more bids for the opportunity to serve an advertisement to a publisher via an advertisement exchange, wherein the system may make an initial prediction as to whether an advertisement and an associated bid will win one or more of an internal bidding process and if submitted to an advertisement exchange server will win the external bidding process, and likewise, if winning the external bidding process whether the published advertisement will lead to an impression and further a conversion.

Specifically, in one implementation, the AI module may be configured for determining one or more probabilities that a bid and associated advertisement, such as in a treatment group, will win an internal and external bidding process, become an impression, and finally will become a conversion. Likewise, once one or more of these probabilities are determined for the bids in the treatment group, the AI module may determine the probabilities of one or more bids and associated advertisements in a control group would win an internal and external bidding process, become an impression, and finally will become a conversion, such as in a manner wherein the associated bids and advertisements in control may not actually be submitted to the internal and/or external bidding process, and thus, cannot actually become an impression and/or a conversion. For instance, in various instances, the system may be configured for receiving input data, e.g., effect data, such as data received by the system as to the effectiveness of advertisements in treatment to win a bidding process and become an impression and/or conversion, and using that known effect data to determine a probability that corresponding advertisements in a control group would win various bidding processes and become an impression and/or conversion, while not having to incur the expenses of actually serving an advertisement to the bidding process, e.g., on the external exchange.

Likewise, the AI module, or other system processing engine, may then be configured for, e.g., employing various actual (known) results data, determining the incremental lift caused by an advertisement, such as by determining the lift caused by the serving of the advertisement in a test group over the predicted success of that advertisement in a control group, wherein the advertisement in the control group is not actually served to an advertisement exchange. In such an instance, the system may include a workflow manager system (WMS), whereby the WMS may be configured for receiving and analyzing the effect data for the treatment group, and other such data, and performing one or more effect based and/or predictive analyses on the data so to determine one or more correlations there between, and using that correlation data determining an incremental lift. For example, in various embodiments, the methods and/or systems herein disclosed may be adapted for correlating an effect data for an advertisement in a treatment group, e.g., treatment effect data, which data may include one or more actual impression and/or actual conversion data, with advertisements in a control group, so as to determine a probability that an advertisement in a control group would become an impression and/or conversion if it were to be served to the advertisement exchange.

Particularly, as described herein, the system may be configured for associating bids to advertisements, separating those bids into both a treatment group and a control group, making an initial prediction, e.g., via a suitably configured inference engine, regarding the successfulness of the advertisements and associated bids in the treatment group to win the opportunity to serve the advertisement to a publisher by winning the external bidding process, and then determining the initial probability that the advertisement in the treatment group will become an impression and/or conversion. This initial prediction data and the results thereof may then be collected by the system and then submitted to a machine learning unit of the AI module, whereby the prediction data can be compared to the actual received effect data, e.g., from the treatment group, and from the results of an analysis thereof, an initial predictive model applied to the treatment group, may be modulated so as to better calibrate the system to error correct the initial model to produce a refined model that then may be applied so as to make a better prediction by then being applied to the bids in a control group in a manner that more closely approximates the actual results that would be returned if the advertisements and associated bids in the control group were to actually be submitted to the external exchange.

In various embodiments, components of the system may include one or more of a server, including one or more processors, such as to form a processing pipeline, a database, such as a structured database, one or more sources for results, e.g., impression and conversion and lift, related data, a search browser, and the like. In particular embodiments, the server may be a plurality of servers. As indicated, in particular instances, the system may be configured for running a plurality of workflows, and may, therefore, include a workflow manager (WMS) for implementing one or more of the analyses described herein, which in some instances, can be implemented in a processing pipeline configuration. Accordingly, as disclosed herein, the system may not only be configured for receiving effect data, e.g., impression and conversion data for a treatment, but in various instances, the system may further be configured for correlating the received effect data with one or more predicted results data, e.g., predicted impression and conversion data, for a treatment group.

For instance, the workflow manager of the system may be configured for implementing one or more deterministic rule systems, so as to derive results data pursuant to its analysis of the actual effect data, with respect to test group impressions, conversions, and lift, and in response thereto modulating one or more predictive models being applied to a control group. For example, in certain embodiments, the system may include a variety of different databases, which various databases of the system may be configured so as to have a relational architecture, which may further be adapted to include one or more constructions with respect to one or more advertisements being presented, or proposed to be presented, to consumers and how those consumers respond, or are predicted to respond, to those advertisements and other such advertisements, such as with respect to one or more characteristics of each of the individual consumers. These constructions may include one or more defined characteristics of the advertisement and one or more defined characteristics of the individual consumer being exposed, or proposed to be exposed, to such an advertisement, e.g., a potential bidding opportunity, which characteristics may be represented by one or more table structures.

For instance, a series of tables, for instance, may be employed by which correlations may be made by the WMS in an iterative fashion. Particularly, in various use models, a first correlation may be made with respect to determining a probability that an advertisement in a test or treatment group will win one or more bidding opportunities and/or become an impression and a conversion, and the actual results data, whereby the predictive model may be tested, and if need be modified before being applied to one or more advertisements in a control group, the results of which may then be employed in determining one or more further correlations pertaining to calculating the incremental lift for that advertisement. For example, another table may then be employed to correlate the effect data for the test group to be applied in developing the predictive model for application to advertisements within a control group. Likewise, with the appropriate feedback entered into the system, a further table may also be included and used to correlate the actions actually taken by the various consumers, with respect to having been exposed to one or more advertisements, so as to generate a consumer profile for each consumer that may represent a current or future bidding opportunity.

A key, such as an internally derived identification designation, may be used to correlate the data within each of the tables, which key may be used to access the data of the tables, such as in response to a question, inquiry, prompt, or command, such as should a bid be made for a given consumer and/or if so how much should be bid by a given advertiser. The key may be any common identifier, such as a name, a number, a code name, and the like, by which one or more of the tables may be accessed, correlated, and/or a pertinent question asked and answered. Without the key, it becomes more difficult to build correlations between the information in one table with that of another.

Accordingly, a key aspect of the present technology may be a data structure for answering a query, such as in response to a bid request, wherein the data architecture may be structured and searched in response to a query. In a typical architecture the database may be a relational database, such as a Structured Query Language (SQL) database, which may be implemented via a relational database management system (WMS). For example, in one implementation, the SQL database may be a table or tree based database, such as where one or more tables, e.g., look up tables (LUT), form a structure, e.g., a table or tree, wherein data may be stored, searched, relations determined, and queries answered.

Particularly, in various embodiments, a table or tree based database may be presented, searched, and used to determine relationships from which answers to one or more queries, e.g., pertaining to bidding opportunities, may be determined. For instance, typically, a SQL database for use in accordance with the methods disclosed herein, have a relational architecture. These constructions may be represented by a table or tree structure. A series of tables, for instance, may then be employed by which correlations may be made in an iterative fashion. For example, with respect to the advertisement and/or lift analyses discussed herein, a first correlation may be made with respect to one or more characteristics of a bidding opportunity, how much should be bid for the opportunity and by which advertisers, and the expected return on the investment represented by that bidding opportunity.

Another table may then be employed to test the usefulness of an advertisement to produce an incremental lift by running a test campaign for a given advertisement by separating bidding opportunities into test and control groups without having to submit associated advertisements in the control group to an external exchange that may otherwise be expensive. Likewise, as indicated above, a further table may be used to correlate determined lift by an advertisement in a known result to future bidding opportunities in a presently unknown group, so as to more accurately determine a return on investment opportunity represented by potential online consumers. The key may be used so as to access, search, and correlate data from the one or more of the tables, or tree structures, such as in response to a query or question entered by the user, or generated by the system. As indicated the data architecture that may be used to structure a database may be a data tree, where various data elements may be stored in a compressed, but correlated fashion, and/or in a hash table, as described herein.

In certain instances, the database to be deployed by the system may have a graph based architecture, which database may be structured and used to determine the results for one or more queries, such as where the query pertains to whether an advertiser should bid on a particular bidding opportunity, and if so, what are the effects, e.g., lift, of having bid on the opportunity. Particularly, a knowledge graph architecture may be employed to structure the database, so as to enhance the performance of computational analyses executed using that database. In certain instances, the sophisticated algorithms disclosed herein, are adapted for structuring the infrastructure of a relational database so as to enable more efficient and accurate searching such as via performing graph based analyses, as well as for performing table or tree based analyses, such as for determining return on investments and lift expected to result from running an advertisement campaign.

Consequently, in one aspect, a device, system, and methods of using the same to build a searchable, relational data structure, such as a knowledge graph described herein, are provided. For instance, in one instance, the machines and methods disclosed herein may be employed so as to generate and/or otherwise collect data. Specifically, the machines and methods disclosed herein may be used to generate a searchable data structure for storing that data in a relational architecture. In various instances, additional data may be generated or otherwise be transmitted into the system, such as via a suitably configured API, which data may also be configured for being stored in the relational data structure, such as other genomics, genetic, and/or other clinical data. For instance, in another aspect of the disclosure, the system may include an artificial intelligence (AI) module that may be configured to provide a more comprehensive analysis on generated and/or provided data. For example, the AI module may be configured so as to implement one or more machine learning protocols on the data attained by the system that are devised to teach the AI module to perform one or more correlations, such as between various conditions affecting bidding opportunities and advertisement effectiveness so as to better evaluate campaign effectiveness and better evaluating bidding opportunities to be capitalized or passed on.

Specifically, the AI module may be configured for receiving one or more inputs, such as from one or more advertisement exchange servers and/or publishing servers, and may be adapted for building and structuring a database for evaluating bidding opportunities. For instance, in a first step, data may be collected, cleaned, and then be prepared for analysis. In various embodiments, the data may be labeled and/or categorized, such as with respect to metadata. For example, a skimmer may be implemented for collecting bidding opportunity and effect data for the purposes of structuring the database, such as for providing a relational structure to the database. And once the database is structured, it may then be populated with data, e.g., consumer data, publisher data, advertisement data, etc. in accordance with determined or inferred relationships.

In certain instances, a machine learning protocol, as disclosed herein, may be employed so as to determine relationships between data points entered into the database. Such relationships may be determined based on known facts, e.g., effectiveness of advertisements in the treatment group, and as such the learning may be supervised learning, e.g., such as where the data entered into the database is categorized in accordance with one or more categories and/or labels, and as explained, may be used later to apply a predictive model for use in determining probabilities for advertisements in the control group. Particularly, known factors may be used to label, categorize, and store data, which may be informed by the query being sought to be answered, e.g., whether lift is being determined or return on investment. Hence, knowing factors by which to label and categorize the data being stored makes building the storage architecture more efficient, such as with respect to evaluating any particular consumer as a bidding opportunity.

In other instances, the learning may be inferred, such as in an unsupervised learning. For instance, in certain instances, the data to be stored may not be known, relationships between the data may not have been determined, and the query to be answered may also not be identified, such as where the opportunity to bid on a previously uncharacterized consumer is to be evaluated and/or determined. In such instances, the data to be stored is unsupervised, and as such, patterns in data to be stored and their relationships, such as commonalities between data points, e.g., between a known and an unknown consumer, may be determined, and once determined such patterns may then be used in forming the architecture that structures the data storage. For example, in various embodiments, the A/I module may include programming directed at training the system to more rapidly, e.g., instantly, recognize how an output, e.g., a result of a prediction, was achieved based on the type and characteristics of the input, impression and/or conversion, received. The system, therefore, may be configured for learning from the inputs it receives, and the results it outputs, e.g., with respect to the incremental lift of an advertisement, so as to be able to draw correlations more rapidly and accurately based on the initial input of data received, such as for an unknown bidding opportunity.

Typically, the input data may be of two general types. In a first instance, the data may be of a type where the output, e.g., the answer, is known, such as where a predictive model used against bidding opportunities in a test group having a known outcome is used to train a predictive model for use in that test group. This type of data may be input into the system and used for training purposes. The second type of data may be data where the answer is unknown, and therefore, must be determined, such as where using that test group trained predictive model for evaluating bidding opportunities in the control group. This data may be any form of data, but in various instances, may be data pertaining to a description of one or more conditions, such as describing one or more conditions of a potential consumer that may represent a bidding opportunity, as well as conditions of past consumers on whom bids were made and the effects achieved by performing those bids, such as with respect to impression and conversion rates.

Effect data, such as feedback data, e.g., from the exchange server and/or publisher, may then be elicited or otherwise retrieved. This effect data may be used to enhance the AI module's ability to learn from the first type of input data, condition data, so as to better predict the outcome for the second kind of input data, inferred wellness agent data, so as to be better correlate conditions with those agents that can affect those conditions, such as in a positive or negative manner. Specifically, based on historical evidence, e.g., with respect to a test group, the AI module may be configured to learn to predict outcomes, such as in a test group, based on previously observed data, such as with respect to various new individual bidding opportunities presented to the system, such as with to new bidding opportunities having the same or similar conditions.

More specifically, an advertisement platform is presented herein, wherein the platform is configured for evaluating and/or determining various potential opportunities a consumer represents, such as for an advertiser running an advertisement campaign. In such an instance, one or more consumer profiles may be generated for various potential bidding opportunities, which consumer profiles may be generated by collecting online use data from a variety of consumers. Particularly, in combining these datasets from various test groups, the AI module is configured for determining the various interrelationships between them, e.g., various consumers, and the advertisements proposed to be provided to those consumers. Accordingly, at the heart of the AI platform may be a structured architecture, such as a graph based database, which may be configured for receiving data from a plurality of different sources, such as effect based data from a publisher and/or other sources of information pertaining to the potential consumers and/or their characteristics, and any type of other data useful in accordance with the systems and methods disclosed herein.

As indicated, the system may be configured for employing the received data in one or more learning protocols, such as for machine learning. For instance, machine learning takes place by training the system to instantly recognize how an output was achieved based on the type and characteristics of the input received. The present system is configured for learning from the inputs it receives and the results it outputs, so as to learn to draw correlations more rapidly and accurately based on the initial input of data received. The system, therefore, receives a first set of data wherein the outcome is known, e.g., data received via the effects of an advertisement in the test group, and this data is employed by the system to generate one or more rules by which a result may be obtained, and once obtained compared to the known outcome, and may then be applied to evaluate opportunities in a control group. Consequently, the system is configured to train itself to better recognize correlations between data points within the database more accurately, e.g., with less false positives, and more efficiently, and to make more accurate predictive outcomes.

In such a manner the machine learning algorithm may learn behaviors, determine accuracy, and may be used by the artificial intelligence module to analyze further sample sets, e.g., of bidding opportunities, with respect to answering one or more search queries, such as a query requiring the AI module to infer correlations between nodes or datasets.

Hence, once the AI machine learns the behavior, of how the advertisement performed in the treatment group, the learned behavior may then be applied to a second type of data, such as by an inference engine, that is used to answer one or more unknown variables, e.g., how an advertisement in the control group will perform, such as without having to be submitted to the advertisement exchange.

The more the machine learns from the first type of input, e.g., test, data, the better the inference engine becomes at predicting the outcome for the second kind of input data, e.g., control group data. Specifically, based on historical evidence, the artificial intelligence module may be configured to learn to predict outcomes based on previously observed data. With respect to determining incremental lift, the present lift analysis platform is configured to correlate the performance of advertisements in a control group with the performance of advertisement in a control group and with respect to evaluating each individual bidding opportunity represented by a given consumer.

Accordingly, in a first step, a graph database or knowledge graph may be constructed. For example, in this instance, the knowledge graph may be composed of three typical elements, which basically include a subject, a predicate, and an object, these may form nodes, and the relationship between the nodes must be determined. Any particular data point may be selected as a node, and nodes may vary based on the queries being performed. There are several different types of relationships that can be determined.

For instance, relationships may be determined based on their effects, e.g., they are effect based; or they may be determined based on inferences, e.g., relationships that are unknown but determinable. Particularly, each effect and/or relationship may be characterized by different properties or characteristics, which characteristics may be used to generate weights, probabilities, make assumptions, and the like. Such properties may be used to populate the knowledge graph with data points that may form the nodes of the graph. More particularly, to better determine causal and/or predictable outcomes the various different relationships may be weighted, such as based on the degree of certainty, number of commonalities, number of instances sharing the node, number of common relationships, and the like.

In various embodiments, a schema may be formed, such as where the schema is an architecture that is used to give structure to the graph. Hence, the construction and implementation of a dynamic knowledge graph may be at the heart of the advertisement analysis platform. For example, with respect to constructing the knowledge graph, any particular data point may form a node. For instance, on one side of the graph predictive data pertaining to the test group may be delineated, and on the other side of the graph a set of predictive data pertaining to the control group may form a node. In between these two nodes may be a third node, e.g., a series of third nodes, such as one or more conditions, properties, or qualities represented by one or more potential consumers. Additionally, in between these nodes are the relationships that may be determined.

Specifically, when building the knowledge graph, data pertaining to an advertisement and bidding opportunities in the present and past may be added to the graph and allocated to either a test or a control group. In certain instances, the data may be effect based data, and in some instances may include predicted data. Once these two nodes, e.g., pertaining to a predicted performance and an actual performance, such as for the treatment group, have been established, one or more third nodes, may be input into the system, such as with respect to the control group, from the presence of which the relationship(s) between the two original nodes and/or the third node may be determined. For instance, in one example, a first node may be represented by the predictions made for a person or a population of people, e.g., in the treatment group, and a second node, may be represented by a condition or characteristic of a potential consumer, and the third node may include bidding opportunities by potential consumers in the control group. A series of relationships may then be determined by analyzing various points of connection between these three items.

Particularly, in a particular instance, one node may represent a bidding opportunity in a treatment group, a second node may represent a prediction about that opportunity, and a third node may represent the results or effects of that prediction, which then may be applied to making a prediction pertaining to one or more members in a control group, which may be part of the third node or may represent a fourth node. Likewise, this process may be repeated for multiple individual's, e.g., bidding opportunities, having the same or similar conditions. Hence, in a manner such as this, the correlation between potential consumers conditions that may affect their future behaviors may be determined or otherwise predicted.

Accordingly, a step in building a predictive analysis graph is to define the anchor nodes, these represent the two bounding elements between which all the various commonalities are defined and explored. A further step is to define all the possible known correspondences between the two anchor nodes, which may be represented in the graph as a third node, and which can be used to make one or more predictions. These known correspondences may be built around detailing the effects caused by and/or the characteristics of one node or the other. These may form the known and/or observable relationships between the nodes, such as in relation to the treatment group, and may be used to train a predictive model. From these known relationships, a second type of relationship, such as how an advertisement in a control group may perform, may be explored and/or determined which relationships may be built on inferences. Further, to better determine causal and/or predictable outcomes the various different relationships may be weighted, such as based on the degree of certainty, number of commonalities, number of instances sharing the node, number of common relationships, and the like, such as commonalities between various potential consumers representing bidding opportunities.

Hence, in various embodiments, the construction and implementation of a dynamic knowledge graph may be at the heart of the dynamic lift processing platform. As indicated, the various processing platforms of the global system may be coupled together, so as to seamlessly transfer data between its various components, such as between the advertisement server, the advertisement exchange server, and the publisher server. For instance, as indicated, the receiving and transferring of data, e.g., effect data, to the artificial intelligence module may be performed in a substantially seamless manner, such as via a hyper-interconnect. Particularly, the AI module may be configured for receiving the results data from the ad exchange or publisher server, and for taking the results data and using it to generate one or more nodes, within the knowledge graph. Further, the system may be configured for retrieving data about one or more consumers and/or their conditions. More particularly, the system may retrieve pertinent condition data pertaining to a potential consumer in any suitable manner, and/or may include a skimmer or search engine that collects data, e.g., online data, that pertains to the various conditions of potential bidding opportunities.

Additionally, once the knowledge graph architecture has been constructed, it can continually be updated and grown by adding more and more pertinent data, from one or more bidding opportunities, one or more advertisements, which data may be input into the knowledge structure, building more and more potential nodes and/or relationships. In such an instance, the bounding nodes may be of any combination of nodes, and as such, in certain instances, may be user selectable. With this data the AI module may generate a suitable knowledge graph (and/or add to an already existing knowledge graph), from which knowledge graph the bounding nodes may be selected and various relationships between the nodes may be determined. From these data one or more nodes within a knowledge graph characterizing that individual may be generated and one or more nodes representing one or more wellness agents may be populated and be evaluated for formulating an individualized composition to be administered to the individual at a predicted or otherwise determined dosage so as to help that individual meet their wellness goals.

Particularly, with this data the AI module may generate a suitable knowledge graph (and/or add to an already existing knowledge graph), from which knowledge graph the bounding nodes for the individual, their conditions, and one or more wellness agents, may be selected and relationships between them determined. A workflow for a treatment or control group calculation may be worked up, e.g., previously embedded within the system or entered into the system, a query may then be run, and a predictive model may be initiated on the data to determine one or more relevant query results that are particular to the advertisement, the advertisement campaign and/or an individual's personal characteristics represented by a bidding opportunity. In any of these instances, these characteristic data may be uploaded into the system and may be populated into one or more knowledge graphs of the system, whereby various nodes may be identified and/or correlated from which data correlations and various relationships may be determined, inferences assessed, calculations performed, and predictions made and/or reported. For instance, in such a manner, this data, as well as any other relevant data, along with all properties relevant to a particular query to be analyzed, may be uploaded into the system and be used to form a constellation of nodes, which nodes may be employed to determine various relationships pertinent to the individual, such as by querying the system and allowing it to generate the appropriate connections from which an answer may be inferred. Once populated in a manner such as this, one or more queries may be run against the data so as to isolate various sub-profiles that may then be mined for relevant relationships and/or correlations.

Specifically, these characteristic data may then be employed by the AI module so as to determine one or more correlations and/or perform one or more calculations with respect thereto and thereby derive and propose a predictive model for the effect a proposed advertisement will have on a potential consumer represented by a bidding opportunity, with respect to one or more of an impression or conversion rate or an incremental lift determination. In various instances, the results of the predictive analysis, such as with respect to one or more consumers and one or more advertisements, may also be determined by the system and tracked over the course of time, and in various embodiments, these results may be used to generate a collective knowledge graph of a plurality of individuals, and/or for each individual over a longer period of time, whereby pertinent data may be analyzed by the system, any relationships between them may be determined by the AI module. Relationships between two or more characteristics in a subject, or between subjects, may then be determined, and used to inform the predictive modeling such as with respect to whether to make a bid, for how much, and/or what the return of that investment is expected to be.

More particularly, in one use model, a relationship between two properties, e.g., property A: the qualities and characteristics of an advertisement, and property B, one or more qualities and characteristics of an individual representing a bidding opportunity, may be input into the system and analyzed, e.g., with respect to a treatment group, and from that determined relationship, bidding opportunities represented by individuals in a control group may be evaluated. Specifically, a series of historic readings for each characteristic property, e.g., of an advertisement and/or bidding opportunity, may be entered into the system, e.g., 1,000 readings of each, whereby the machine learning platform of the system may analyze the results, and/or determine one or more correlations and/or relationships between the two properties, such that if a given property, e.g., advertisement A, is entered into the system, the predicted property, e.g., effect on consumer B, output may be inferred, taking the predictive weights between the two into account.

In such an instance, when evaluating the inputs with reference to properties A and B, a relationship between the two may be determined by the artificial intelligence processor, such that if given a new input for property A, e.g., a new advertisement is served, the determined relationship may then be used to predict what the outcome of property B will be, e.g., will the same or a new consumer act upon the advertisement, given that the two properties may be predictably related. This machine learned relationship may, therefore, be employed to determine when the two properties are in alignment with one another, e.g., everything is functioning as it should, and, may further be used to determine when things are not functioning in alignment, such as when the predicted outcome is not observed, and thus, is indicative of their being a problematic state.

In certain instances, however, the relationship between two or more properties are not linear, but rather may be more complex. For instance, in certain embodiments, the artificial intelligence module may be configured to model more complex processing of relationships in a manner similar to a neural network, such as in a deep learning protocol. Accordingly, although in some instances, the relationships may be configured in a linear array, such as to form a direct linkage between the properties, in other instances, the relationships may be layered one on top of the other so as to form a stacked, e.g., neural, network of information. Hence, in particular instances, the relationships may be formed in a multiplicity of stages and/or levels, where one level of information is connected to the next level of information, such as in a deep learning protocol. Additionally, the relationships between the various properties from one, or the same, level to another may be strengthened, and therefore given greater weight, or weakened, and consequently given less weight, by the machine learning protocol engaged.

Accordingly, as information is processed and allocated across the properties in the different, or same, levels of the system, at each stage, a variety of different points are being given greater and greater, or lesser and lesser, weights, such that when given a particular input, the AI module may more efficiently predict a given outcome more accurately based on the various different levels of weighted historical information. For example, the AI system may be adapted so as to process information in a layered or multi-staged fashion, such as for the purpose of deep learning. The system may be configured to evaluate data in stages. Specifically, the AI module may be adapted such that as it examines various data, such as when performing a learning protocol, stage by stage, level by level, where each connection between data gets weighted by the system, e.g., based on historical evidence and/or characteristics of relationships. The more stages and/or levels of learning that are initiated within the system the better the weighting between junctions will be, and the deeper the learning.

Further, uploading data in stages allows for a greater convergence of data within the system. Particularly, various feature extraction paradigms may also be employed so as to better organize, weight, and analyze the most salient features of the data to be uploaded. Additionally, in order to better correlate the data, one or more users may input and/or modulate basic weighting functions, while the system itself may employ a more advanced weighting function based on active learning protocols. Particularly, a deep learning protocol may be employed in training and implementing a search function of the disclosure as discussed herein. More particularly, deep learning is a paradigm where increased levels of datasets are employed in generating an answer to a query.

If there is only one stage of learning involved, when answering a query, the network architecture may be configured as a neural network. However, if the determination implements a multi-stage learning process, when deriving an answer to a query, the architecture may be configured as a deep learning network. The more stages there are, where each stage includes a weight, the deeper the learning will be. But, with each stage added, the computing power required to make the data converge becomes greater and greater. Specifically, with each additional data set being processed, another node is generated, which increases the level of future processing power.

With respect to the present disclosure, when running a deep learning protocol, the process first implements a feature extraction protocol, where salient features, e.g., from a first advertisement or bid opportunity, are extracted and considered in comparison with similar features stored in a database of previously extracted features, e.g., from previous advertisements or bid opportunities, such as where each feature represents a characteristic that may be categorized into one or more classes or labels, which labels may be used to recognize patterns whereby the machine can therefore be trained to recognize the reoccurrence of those patterns in other representations, and thereby draw conclusions and predictions based on those recognized patterns.

Accordingly, in order to perform machine learning there may be a library of functions. This is useful, for instance, where an anchor characterization may be identified, such as of an advertisement in a test group or with respect to a particular bidding opportunity, and subsequent analysis or distribution does not involve analysis or distribution of the entire subsequent characterizations, but rather, only data pertaining to any differences or divergence from the anchor, such as in response to a second advertisement delivered to that same or similar test group or bid opportunity. This is termed feature extraction, the preferential analysis of the anchor characterization, or in some instances, only the deltas. Accordingly, in various instances, methods disclosed herein are directed to using labels, e.g., pointers, to categorize and structure a database, such as for use in the artificial intelligence module to analyze data therein.

In such machine learning the data may be first cleaned and prepared for feature extraction, e.g., of genetic and/or clinical and/or other significant data. Such data, once extracted may be captured with respect to an individual, a group of individuals, a population, and may be based on one feature, a plurality of features, etc. thereby building a library of features as data is coming into the system. And once the data is in the system, the machine may be trained to build the graph assembly so as to generate potential levels of correspondences.

As indicated, the AI system may be configured for answering a query, such as with respect to a determined probability that a given advertisement will provoke a given response from a particular potential consumer. Accordingly, when performing a search function of the A/I repository or database, the database may be configured as a relational database, wherein the architecture of that database is such that it is structured as a table or tree, or the architecture may be configured such that data is stored therein in a graph form, such as a knowledge graph, as described above. Additionally, when performing a search of the database, the search may be an effect based or an inference based search query.

An effect based search is typically one where the outcome is known and/or expected, such as when using the treatment group to train the machine learning model, whereas in an inference based search, the outcome is not known, such as when applying the trained machine learning model to bid opportunities in the control group. Although table based searching is useful, it is based on known relationships that are categorized by tables, which may be searched by using the known key. Such searching is generally effect based searching, where the answer is known, and the relationship with its query simply needs to be identified, e.g., via the use of the key. Inference based searching, on the other hand, is where the relationship between two data points is unknown, but to be determined based on the building of a knowledge graph and the learnings of the system with respect to other relationships and the rules of those relationships, allow for new relationships to be discovered and otherwise unknown outcomes to be determined.

As such, the generation and implementation of the knowledge graph is a useful feature of the present search function in an inference based learning schema upon which the machine learning and inference engines, as herein described, are primarily built. Hence, as data flows into the database, it is formulated into one or more of these, or another, such structure, and the data, e.g., where its relationship to other data is known, may then be employed to train the search function of the system to determine data points and/or relationships between data points where the relationship was not heretofore previously known, that is a key is not required to determine the presence of the relationship. Specifically, once the known relationships, e.g., for the test group, have been determined, through a training process, the newly trained system, and the rules developed, may then be employed, e.g., on the control group, to infer other relationships, heretofore unknown, between the data points with a probability establishing the prediction that the inferred relationship is in fact an actual relationship.

In such a manner, various conditions of an advertisement and/or bidding opportunity may be entered into the system, as one set of a collection of data points, and likewise a set of characteristics of a variety of other advertisements and/or bidding opportunities, may also be entered into the system as well, and this data may be employed to build a knowledge graph whereby the various relationships, known and inferred, between these data may be determined. This may be done for one or a plurality of advertisements, for one or a plurality of bidding opportunities for one or more of the treatment and control groups, where the relationships and the learnings therefrom may be used to determine known outcomes, such as for training the system, e.g., using the treatment group, and once suitably trained the system may then employ these learnings in determining heretofore unknown relationships so as to infer outcomes therefrom, such as with respect to the control group. Hence, known facts and relationships may be used to train the A/I engine, which once trained may determine rules by which unknown relationships may be determined and outcomes based on those relationships may be inferred and/or otherwise determined, such as by a suitably configured inference engine of the system.

Accordingly, the AI system server, e.g., the machine learning and inference engine implementations, may be positioned remotely from the location from where the condition is uploaded into the system, but may be accessed locally or remotely as described herein. This data serves many purposes, one such purpose being the training of the AI module, and/or its use in one or more predictive models. In such training, known relationships and outcomes can be treated as if they are unknown, and consequently the machine may be made to determine the relationships and predict the outcomes anew, which training may continue until the system has learned to predict the right outcome, e.g., in the treatment group, which once error corrected can then be applied to bid opportunities in the control group.

Particularly, this training, e.g., two class-model training may be used for a sub-portion of the data, e.g., 50%, the training portion, and the other data may be used to test the learnings from the training portion to predict the known outcomes, with respect to the other 50% of the training group data. Hence, the first portion of the treatment group data may be employed to develop a training model, and the second portion of the data may be used to test the training models to enhance the accuracy of a predictive model, which once sufficiently trained may be employed to make other inferences and thereby predict other outcomes, such as with respect to the control group. For example, once trained, the inference engine may be employed to search the database in response to a query and based on the known and/or inferred relationship between the various data of the system an answer to that query may be inferred, such as with respect to determining a probability of an outcome, and an outcome predicted, e.g., a given request may be input into the system, and an answer may then be generated by the system based on the relationships between the data.

One, two, three, or more inputs may be entered into the system, in addition to a query, and an output may be determined and returned by the system. Specifically, as indicted above, the data entered into the system may be used to train the system, and once trained the system may be employed to make one or more correlations or predictions, therewith, such as in response to a query regarding the probability of a predicted outcome. Accordingly, in various instances, the system may include an inference engine, such as configured as a neural network, that is adapted for receiving a plurality of inputs, performing an analysis of the data, and generating one or more correlations between the various data points. In particular instances, the system is configured for allowing the inference engine to be accessed remotely, such as via a cloud based interface accessed through a client computer.

Consequently, once the various relationships have been defined and weighted, a predictive query, such as in the form of an "If"/"Then" statement may be made, such as where the system determines a query to be run by the system, such as with respect to the performance, e.g., lift, due to an advertisement of an advertising campaign, and the inference engine determines the "then" portion of the statement by employing a predictive model to generate a resultant outcome, such as based on a probability outlook. The inference engine may then use that data to build a knowledge graph whereby the system may then return a proposed outlook for the a given bid opportunity with relation to an advertisement in the control group. In various instances, certain aspects of the artificial intelligence module may be accelerated, such as by being implemented in hardware, such as by a suitably configured integrated circuit, such as by an FPGA, ASIC, Structured ASIC, and the like.

For instance, in certain embodiments, the AI system may be configured to model a neural network, including a deep learning neural network, which may be formed of layers and layers or processing engines, where the more layers provided the deeper the learning configuration, and where each processing engine is trained in accordance with the methods disclosed herein to perform predictive analyses, which based on the number of layers may allow for exponential analyses to be performed. Accordingly, to provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

The contents of the articles, patents, and patent applications, and all other documents and electronically available information mentioned or cited herein, are hereby incorporated by reference in their entirety to the same extent as if each individual publication was specifically and individually indicated to be incorporated by reference. Applicants reserve the right to physically incorporate into this application any and all materials and information from any such articles, patents, patent applications, or other physical and electronic documents.

The methods illustratively described herein may suitably be practiced in the absence of any element or elements, limitation or limitations, not specifically disclosed herein. Thus, for example, the terms "comprising", "including," containing", etc. shall be read expansively and without limitation. Additionally, the terms and expressions employed herein have been used as terms of description and not of limitation, and there is no intention in the use of such terms and expressions of excluding any equivalents of the features shown and described or portions thereof. It is recognized that various modifications are possible within the scope of the invention claimed. Thus, it should be understood that although the present invention has been specifically disclosed by preferred embodiments and optional features, modification and variation of the invention embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the methods. This includes the generic description of the methods with a proviso or negative limitation removing any subject matter from the genus, regardless of whether or not the excised material is specifically recited herein.

Other embodiments are within the following claims. In addition, where features or aspects of the methods are described in terms of Markush groups, those skilled in the art will recognize that the invention is also thereby described in terms of any individual member or subgroup of members of the Markush group.

That which is claimed is:

1. A predictive system for determining incremental lift of a media rich advertisement in a treatment group submitted to an advertisement exchange server in response to a bid request, the predictive system comprising:
   one or more client computing devices for generating media rich advertisements having embedded metadata associated therewith, the embedded metadata including one or more classifications for categorizing each generated media rich advertisement as to type, each one or more client computing devices including a communications module for transmitting respective generated media rich advertisements via a network connection;
   an advertisement exchange server for receiving, via the network connection, bid requests from publishers having advertisement inventory, each bid request being directed to a designated advertisement type, the advertisement exchange server being configured for:
      transmitting, over the network connection, a received bid request to a plurality of supply side servers in response to bid request receipt,
      receiving bids and bid associated media rich advertisements in response to the transmitted bid request, the bid associated media rich advertisements being classified according to the designated advertisement type,
      conducting an external bidding process, whereby received bids are evaluated,
      determining a winning bid and winning bid associated media rich advertisement, the winning bid having won the external bidding process, and transmitting, over the network connection, the winning bid associated media rich advertisement to the publisher for publication of the media rich advertisement; and at least one advertisement supply side server configured for:
- receiving, via the network connection, media rich advertisements from at least one of the one or more client computing devices, the media rich advertisements being stored in a structured database in accordance with each respective advertisement's categorized type,
- receiving, via the network connection, a plurality of bid requests from the advertisement exchange server, the bid request requesting advertisements of a designated type,
- splitting the plurality of bid requests into a first treatment bid group and a first control bid group,
- identifying media rich advertisements in the structured database to produce identified media rich advertisements that are of the designated type directed by the bid request,
- eliciting, in response to the bid request, internal bids, and associating the internal bids with respective identified media rich advertisements for potential submission to the advertisement exchange server,
- conducting an internal bidding process amongst the identified media rich advertisements with respect to their associated internal bids, the internal bidding process evaluating the associated internal bids with respective media rich advertisements,
- determining an initial probability that each bid associated advertisement in the first control bid group would lead to one or both of an impression and a conversion, if the bid and associated advertisement were to be submitted to the advertisement exchange server for participation in the external bidding process,
- generating a rank order for each bid and bid associated advertisement in the first control bid group, the rank order being based on the initial probability that each bid in the first control bid group would become one or both of the impression and the conversion, the rank order having a top portion and a bottom portion, each portion reflecting the initial probability that each bid associated advertisement in the first control bid group would become one or both of the impression and the conversion, thereby producing one or both of an initial control group impression rate and an initial control group conversion rate,
- determining one or both of a treatment group impression error rate and a treatment group conversion error rate,
- applying one or both of the treatment group impression error rate and the treatment group conversion error rate to the top portion of the rank order of the initial control group impression rate and the initial control group conversion rate to produce a second control group predicted impression rate, and a second control group predicted conversion rate, respectively,
- determining an internal winning bid and associated media rich advertisement for submission to the advertisement exchange server, and
- transmitting, via the network connection, the internal winning bid and associated media rich advertisement to the advertisement exchange server for participation in the external bidding process.

2. The predictive system in accordance with claim 1, wherein the at least one advertisement supply side server is further configured for:
- designating a version of the identified advertisements to each of the first treatment bid group and the first control bid group; and
- only transmitting internal winning bids and associated media rich advertisements from the first treatment bid group to the advertisement exchange server.

3. The predictive system in accordance with claim 2, wherein the at least one advertisement supply side server comprises an artificial intelligence module configured for predicting one or both of an initial impression rate and an initial conversion rate for the internal winning bids and associated media rich advertisements of the first treatment group that have been transmitted to the advertisement exchange server to produce one or both of a first predicted treatment group impression rate and a first predicted treatment group conversion rate.

4. The predictive system in accordance with claim 3, wherein the at least one advertisement supply side server is further configured for receiving one or both of actual impression data and actual conversion data for the transmitted internal winning bids submitted to the advertisement exchange server for determining one or both of an actual treatment group impression rate and an actual treatment group conversion rate for the internal winning bids of the first treatment bid group.

5. The predictive system in accordance with claim 4, wherein the at least one advertisement supply side server is further configured for comparing one or both of the first predicted treatment group impression rate to the actual treatment group impression rate, and the first predicted treatment group conversion rate to the actual treatment group conversion rate so as to determine one or both of the treatment group impression error rate and the treatment group conversion error rate.

6. The predictive system in accordance with claim 5, wherein the at least one advertisement supply side server is further configured for placing the internal winning bids of the first treatment group in a bid rank order, the bid rank order being based on an initial probability that each internal winning bid would become one or both of the impression and the conversion, the bid rank order having a top portion and a bottom portion, each portion reflecting a relative initial probability that each internal winning bid will become one or both of the impression and the conversion.

7. The predictive system in accordance with claim 6, wherein the at least one advertisement supply side server is further configured for applying one or both of the treatment group impression error rate and the treatment group conversion error rate to the top portion of the bid rank order of the internal winning bids of the first treatment group to produce a second treatment group predicted impression rate, and a second treatment group predicted conversion rate, respectively.

8. The predictive system in accordance with claim 1, wherein the at least one advertisement supply side server is further configured for comparing the second treatment group predicted conversion rate to the second control group predicted conversion rate so as to determine the incremental lift of the media rich advertisement.

9. An advertisement supply side server for evaluating a bid request from one or more advertisement exchange servers and supplying bids and respective bid associated advertisements to the one or more advertisement exchange servers in response to received bid requests, the advertisement supply side server including a plurality of processing engines for performing operations in an advertisement selection pipeline, the operations comprising:

storing, in a structured database, media rich advertisements, the media rich advertisements having been received from at least one associated third party client computing device, being classified according to type, and being stored in a categorical manner that corresponds to the classification of their type;

eliciting, in response to the received bid request, internal bids, the internal bids representing a price to be paid for an opportunity to serve a media rich advertisement at a publisher's webpage;

querying the structured database, in response to an elicitation for internal bids;

identifying media rich advertisements having a classification corresponding to a type designated by the bid request received from the one or more advertisement exchange servers;

associating an internal bid with each identified media rich advertisement to produce a set of identified type-based media rich advertisements each having an associated internal bid, the internal bid for participation in an internal bidding process;

conducting the internal bidding process amongst the identified type-based media rich advertisements, the internal bidding process evaluating the associated internal bids with respective media rich advertisements;

determining an initial probability that each bid associated advertisement in the first control bid group would lead to one or both of an impression and a conversion, if the bid and associated advertisement were to be submitted to the one or more advertisement exchange servers for participation in an external bidding process;

generating a rank order for each bid associated advertisement in the first control bid group, the rank order being based on the initial probability that each bid in the first control bid group would become one or both of the impression and the conversion, the rank order having a top portion and a bottom portion, each portion reflecting the initial probability that each bid associated advertisement in the first control bid group would become one or both of the impression and the conversion, thereby producing one or both of an initial control group impression rate and an initial control group conversion rate;

determining one or both of a treatment group impression error rate and a treatment group conversion error rate;

applying one or both of the treatment group impression error rate and the treatment group conversion error rate to the top portion of the rank order of the initial control group impression rate and the initial control group conversion rate to produce a second control group predicted impression rate, and a second control group predicted conversion rate, respectively;

determining an internal winning bid and associated media rich advertisement for submission to the one or more advertisement exchange servers; and transmitting, via the network connection, the internal winning bid and associated media rich advertisement to the one or more advertisement exchange servers for participation in the external bidding process.

10. The advertisement supply side server in accordance with claim 9, the operations further comprising:

splitting the plurality of bid requests into a first treatment bid group and a first control bid group;

designating a version of the identified advertisements to each of the first treatment bid group and the first control bid group; and only transmitting internal winning bids and associated media rich advertisements from the first treatment bid group to the one or more advertisement exchange servers.

11. The advertisement supply side server in accordance with claim 10, the operations further comprising predicting one or both of an initial impression rate and an initial conversion rate for the internal winning bids and associated media rich advertisements of the first treatment group that have been transmitted to the one or more advertisement exchange servers to produce one or both of a first predicted treatment group impression rate and a first predicted treatment group conversion rate.

12. The advertisement supply side server in accordance with claim 11, the operations further comprising receiving one or both of actual impression data and actual conversion data for the transmitted internal winning bids submitted to the one or more advertisement exchange servers for the purpose of determining one or both of an actual treatment group impression rate and an actual treatment group conversion rate for the internal winning bids of the first treatment bid group.

13. The advertisement supply side server in accordance with claim 12, the operations further comprising comparing one or both of the first predicted treatment group impression rate to the actual treatment group impression rate, and the first predicted treatment group conversion rate to the actual treatment group conversion rate so as to determine one or both of a treatment group impression error rate and a treatment group conversion error rate.

14. The advertisement supply side server in accordance with claim 13, the operations further comprising placing the internal winning bids of the first treatment group in a bid rank order, the bid rank order being based on an initial probability that each internal winning bid would become one or both of the impression and the conversion, the bid rank order having a top portion and a bottom portion, each portion reflecting a relative initial probability that each internal winning bid will become one or both of the impression and the conversion.

15. The advertisement supply side server in accordance with claim 14, the operations further comprising applying one or both of the treatment group impression error rate and the treatment group conversion error rate to the top portion of the bid rank order of the internal winning bids of the first treatment group to produce a second treatment group predicted impression rate, and a second treatment group predicted conversion rate, respectively.

16. The advertisement supply side server in accordance with claim 9, the operations further comprising comparing the second treatment group predicted conversion rate to the second control group predicted conversion rate so as to determine a predicted incremental lift of the media rich advertisement.

17. A computer-implemented method for determining incremental lift based on one or more bid requests, the computer-implemented method comprising:

receiving, over a network interface by a first computer system, a plurality of bid requests, from a second computing system, each of the plurality of bid requests being directed to a bidding opportunity presented at the second computing system;

splitting, by the first computer system, the plurality of bid requests into a treatment bid group and a control bid group;

designating, by the first computer system, a first version of an advertisement of an ad campaign of an advertiser to the treatment bid group and the control bid group, the first version of the advertisement having an associated bid;

predicting one or both of an initial impression rate and an initial conversion rate for the associated bids in the treatment group to produce one or both of a first predicted treatment group impression rate and a first predicted treatment group conversion rate;

submitting, by the first computer system over the network interface, the first version of the advertisement and the associated bids from the treatment bid group to the second computer system for participation in a bidding process with respect to the plurality of bid requests;

receiving, by the first computer system from the second computer system, one or both of treatment bid group impression data and treatment bid group conversion data pertaining to whether the bids in the treatment bid group were winning bids that won the bidding process, and whether having won the bidding process the advertisement associated with the winning bids was converted to a first impression, and if so, whether they became a conversion to produce one or both an actual treatment group impression rate and an actual treatment group conversion rate, respectively;

comparing, by the first computer system, one or both of the first predicted treatment group impression rate to the actual treatment group impression rate, and the first predicted treatment group conversion rate to the actual treatment group conversion rate so as to determine one or both of a treatment group impression error rate and a treatment group conversion error rate;

determining an initial probability that each bid associated advertisement in the first control bid group would lead to one or both of the impression and the conversion, if the bid and associated advertisement were to be submitted to an advertisement exchange server for participation in an external bidding process;

generating a rank order for each bid and bid associated advertisement in the first control bid group, the rank order being based on the initial probability that each bid in the first control bid group would become one or both of the impression and the conversion, the rank order having a top portion and a bottom portion, each portion reflecting the initial probability that each bid associated advertisement in the first control bid group would become one or both of the impression and the conversion, thereby producing one or both of an initial control group impression rate and an initial control group conversion rate;

ranking, by the first computer system, individual bids of the treatment group, the ranking employing one or both of the first predicted treatment group impression and conversion rate to determine one or both of a first probability of a bid in treatment becoming a treatment impression and a treatment conversion, respectively, based on the rank order, the rank order having a top portion and a bottom portion, each portion reflecting a relative initial probability that a bid in the treatment group would become one or both of an impression and a conversion; and determining one or both of a treatment group impression error rate and a treatment group conversion error rate; and applying one or both of the treatment group impression error rate and the treatment group conversion error rate to the top portion of the rank order of the bids in the treatment group to produce a second treatment group predicted impression rate, and a second treatment group predicted conversion rate, respectively.

18. The computer-implemented method in accordance with claim 17, further comprising determining, using one or both of the second treatment group predicted impression rate and predicted conversion rate, an initial probability that each bid in the control bid group would lead to one or both of the impression and the conversion, if the bid and associated advertisement were to be submitted to the advertisement exchange server for participation in the external bidding process.

19. The computer-implemented method in accordance with claim 18, further comprising generating a bid rank order for each bid in the first control bid group, the bid rank order being based on the initial probability that each bid in the control bid group would become one or both an impression and a conversion, the bid rank order having a top portion and a bottom portion, each portion reflecting the initial probability that each bid in the first control bid group would become one or both of the impression and the conversion, thereby producing one or both of an initial control group impression rate and an initial control group conversion rate.

20. The computer-implemented method in accordance with claim 19, further comprising applying one or both of the treatment group impression error rate and the treatment group conversion error rate to the top portion of the rank order of the control group impression rate and the initial control group conversion rate to produce a second control group predicted impression rate, and a second control group predicted conversion rate, respectively.

21. The computer-implemented method in accordance with claim 20, further comprising comparing the second treatment group predicted conversion rate to the second control group predicted conversion rate for determining the incremental lift of the advertisement.

22. A non-transitory computer-readable medium having instructions stored thereon that, when executed by at least one computing device, cause the at least one computing device to perform operations comprising:

receiving, over a network interface by a first computer system, a plurality of bid requests, from a second computing system, each of the plurality of bid requests being directed to a bidding opportunity presented at the second computing system;

splitting, by the first computer system, the plurality of bid requests into a treatment bid group and a control bid group;

designating, by the first computer system, a first version of an advertisement of an ad campaign of an advertiser to the treatment bid group and the control bid group, the first version of the advertisement having an associated bid;

predicting one or both of an initial impression rate and an initial conversion rate for the associated bid in the treatment group to produce one or both of a first predicted treatment group impression rate and a first predicted treatment group conversion rate;

submitting, by the first computer system over the network interface, the first version of the advertisement and the associated bids from the treatment bid group to the second computer system for participation in a bidding process with respect to the plurality of bid requests;

receiving, by the first computer system from the second computer system, one or both of treatment bid group impression data and treatment bid group conversion data pertaining to whether the bids in the treatment bid group were winning bids that won the bidding process, and whether having won the bidding process, the advertisement associated with the winning bids was converted to a first impression, and if so, whether they became a conversion to produce one or both an actual treatment group impression rate and an actual treatment group conversion rate, respectively;

comparing, by the first computer system, one or both of the first predicted treatment group impression rate to the actual treatment group impression rate, and the first predicted treatment group conversion rate to the actual treatment group conversion rate so as to determine one or both of a treatment group impression error rate and a treatment group conversion error rate;

determining an initial probability that each bid associated advertisement in the first control bid group would lead to one or both of the impression and the conversion, if the bid and associated advertisement were to be submitted to an advertisement exchange server for participation in an external bidding process;

generating a rank order for each bid and bid associated advertisement in the first control bid group, the rank order being based on the initial probability that each bid in the first control bid group would become one or both of the impression and the conversion, the rank order having a top portion and a bottom portion, each portion reflecting the initial probability that each bid associated advertisement in the first control bid group would become one or both of the impression and the conversion, thereby producing one or both of an initial control group impression rate and an initial control group conversion rate;

ranking, by the first computer system, individual bids of the treatment group, the ranking employing one or both of the first predicted treatment group impression and conversion rate to determine one or both of a first probability of a bid in treatment becoming a treatment impression and a treatment conversion, respectively, based on the rank order, the rank order having a top portion and a bottom portion, each portion reflecting a relative initial probability that a bid in the treatment group would become one or both of an impression and a conversion; and determining one or both of a treatment group impression error rate and a treatment group conversion error rate; and applying one or both of the treatment group impression error rate and the treatment group conversion error rate to the top portion of the rank order of the bids in the treatment group to produce a second treatment group predicted impression rate, and a second treatment group predicted conversion rate, respectively.

\* \* \* \* \*